(12) United States Patent
Cho

(10) Patent No.: US 7,683,982 B2
(45) Date of Patent: Mar. 23, 2010

(54) ACTIVE REFLECTIVE POLARIZER, LIQUID CRYSTAL DISPLAY EMPLOYING THE SAME AND METHOD FOR THE SAME

(75) Inventor: Sung Nae Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 11/872,079

(22) Filed: Oct. 15, 2007

(65) Prior Publication Data

US 2008/0198302 A1   Aug. 21, 2008

(30) Foreign Application Priority Data

Feb. 16, 2007 (KR) ...................... 10-2007-0016783
May 11, 2007 (KR) ...................... 10-2007-0046199

(51) Int. Cl.
*G02F 1/1335* (2006.01)
*G02B 27/28* (2006.01)

(52) U.S. Cl. ......................................... 349/96; 359/484

(58) Field of Classification Search .................... 349/96, 349/187, 65, 23; 359/484
See application file for complete search history.

(56) References Cited

U.S. PATENT DOCUMENTS

| 3,560,955 | A | 2/1971 | Hallman |
| 3,599,189 | A | 8/1971 | Hadden et al. |
| 6,429,961 | B1 | 8/2002 | Harary et al. |
| 6,628,355 | B1 | 9/2003 | Takahara |
| 6,813,077 | B2 * | 11/2004 | Borrelli et al. ............... 359/486 |
| 2002/0186469 | A1 | 12/2002 | Kawazu et al. |
| 2005/0218377 | A1 | 10/2005 | Lawandy |
| 2007/0278891 | A1 | 6/2007 | Engquist et al. |
| 2008/0037101 | A1 * | 2/2008 | Jagannathan et al. ........ 359/286 |
| 2008/0198294 | A1 | 8/2008 | Hwang et al. |
| 2008/0198439 | A1 | 8/2008 | Cho |
| 2008/0198440 | A1 | 8/2008 | Cho |
| 2008/0198441 | A1 | 8/2008 | Cho |
| 2008/0199667 | A1 | 8/2008 | Cho |

FOREIGN PATENT DOCUMENTS

| JP | 07-064118 A | 3/1995 |
| JP | 10-048419 A | 2/1998 |
| JP | 10-197844 A | 7/1998 |
| JP | 10-300931 A | 11/1998 |
| JP | 2005-221841 A | 8/2005 |
| JP | 2006-119337 A | 5/2006 |
| KR | 10-2001-0099533 A | 11/1998 |
| KR | 10-2000-0039270 A | 7/2000 |
| KR | 10-2001-0107317 A | 12/2001 |
| KR | 10-2005-0065822 A | 6/2005 |
| KR | 10-05-02115 A | 7/2005 |
| KR | 10-2005-0069097 A | 7/2005 |
| WO | 2004/012002 A1 | 2/2004 |

* cited by examiner

*Primary Examiner*—Thoi V Duong
(74) *Attorney, Agent, or Firm*—Sughrue Mion, PLLC

(57) ABSTRACT

Provided are an optical device, in particular, large active reflective polarizer and a liquid crystal display (LCD) employing the same. The optical device includes: a magnetic material layer having a plurality of magnetic particles and an insulating medium to substantially prevent agglomeration between the magnetic particles; and a magnetic field generating unit applying a magnetic field to the magnetic material layer.

25 Claims, 19 Drawing Sheets

ACTIVE REFLECTIVE POLARIZER, LIQUID CRYSTAL DISPLAY EMPLOYING THE SAME AND METHOD FOR THE SAME

CROSS-REFERENCE TO RELATED PATENT APPLICATION

This application claims the benefit of Korean Patent Application No. 10-2007-0016783, filed on Feb. 16, 2007, and No. 10-2007-0046199, filed on May 11, 2007, in the Korean Intellectual Property Office, the disclosures of which are incorporated herein in their entirety by reference.

BACKGROUND OF THE INVENTION

1. Field of the Invention

Apparatus and methods of the present invention relate to optical devices such as an active reflective polarizer or an optical shutter and a liquid crystal display (LCD) employing the active reflective polarizer, and more particularly, to a large size active reflective polarizer, which can be easily manufactured, and an LCD employing the large active reflective polarizer.

2. Description of the Related Art

FIG. 1 is a perspective view of the wire-grid polarizer 16. Referring to FIG. 1, the wire-grid polarizer 16 includes a transparent substrate 16a and conductive metal wires 16b arranged at regular intervals in parallel to one another on the transparent substrate 16a. The wire-grid polarizer 16 acts as a diffraction grating when the pitch P of the metal wires 16b is greater than the wavelength of light, and acts as a polarizer when the pitch P of the metal wires 16b is less than the wavelength of the light. In the latter case, the wire-grid polarizer 16 reflects light having a polarization component parallel to the metal wires 16b and transmits light having a polarization component perpendicular to the metal wires 16b.

In order for the wire-grid polarizer 16 to act as a polarizer in a visible light range, the pitch P of the metal wires 16b should be less than about 100 nm. The electron beam lithography (E-beam litho), a widely used lithographic technique in semiconductor industry, has been used to arrange the metal wires 16b at such a narrow pitch P at the laboratory levels. This technique, however, is a very costly and slow process that may not be much of an issue in semiconductor industry which deals with devices at the scale of typical microns, but becomes a serious issue when producing wire-grid polarizer to be used in displays, which surface area typically scales from a few to hundreds of squared centimeters (cm$^2$). Although small wire-grid polarizers usable in a visible light range have been manufactured in laboratories (with application of E-beam litho), manufacturing technology for mass production of large sized wire-grid polarizers suitable for display devices is yet to be developed.

SUMMARY OF THE INVENTION

The present invention provides optical devices, in particular, a large size active reflective polarizer that can be mass produced at low cost.

The present invention also provides a backlight unit, a liquid crystal panel, and a liquid crystal display using the active reflective polarizer.

According to an aspect of the present invention, there is provided an optical device comprising: a magnetic material layer having a plurality of magnetic particles and an insulating medium to substantially prevent agglomeration between the magnetic particles; and a magnetic field generating unit applying a magnetic field to the magnetic material layer.

The magnetic material layer may have a thickness greater than the magnetic decay length of the magnetic material layer.

The magnetic material layer may be formed of core-shell type magnetic particles.

The magnetic material layer may be formed by mixing the core-shell type magnetic particles with a paste-state insulating material, and coating and curing the resultant product on a transparent substrate.

The magnetic material layer may be formed by immersing the core-shell type magnetic particles in a solution, and coating and curing the resultant product on a transparent substrate.

Each of the core-shell type magnetic particles comprises a core formed of a magnetic material and an insulating shell surrounding the core.

The number n of the core-shells that light runs into along its path of travel can be given by:

$$n \geq s/d,$$

where s is the magnetic decay length at wavelength of interest for the magnetic material layer and d is the diameter of the core.

The insulating shell may be formed of a transparent insulating material surrounding the core.

The insulating shell may be formed of a transparent polymer-type insulating surfactant surrounding the core.

The magnetic material of the core may be any one selected from the group consisting of titanium, cobalt, iron, nickel, aluminum, barium, platinum, sodium, strontium, magnesium, dysprosium, manganese, gadolinium, sliver, copper, chromium, cobalt-platinum ($Co_xPt_y$), and iron-platinum, ($Fe_vPt_z$), $MnZn(Fe_2O_4)_2$, $Mn\ Fe_2O_4$, $Fe_3O_4$, $Fe_2O_3$ and $Sr_8CaRe_3Cu_4O_{24}$, $Co_xZr_yNb_z$, $Ni_xFe_yNb_z$, $Co_xZr_yNb_z\ Fe_v$, wherein x, y, v and z present a composition rate.

The magnetic material layer may be formed of a mixture of two different type core shell structures, wherein a first type core shell structure has magnetic cores surrounded by surfactants and a second type core shell structure has transparent and dielectric cores surrounded by surfactants.

The magnetic material layer may be formed by mixing the two different type core-shell structures into a solution and by eliminating the surfactants attached to each core via annealing process.

The cores of the first type core shell structure may be formed of cobalt-platinum ($Co_xPt_y$) or iron-platinum ($Fe_vPt_z$), wherein x, y, v and z present a composition rate, and the cores of the second type core shell structure are formed of zirconium-oxide ($ZrO_2$) or silicate ($SiO_2$).

The magnetic material layer may be formed by attaching a magnetic polymer film on a transparent substrate.

The magnetic field generating unit comprises a plurality of wires arranged at regular intervals around the magnetic material layer and a power source supplying current to the plurality of wires.

Spaces between adjacent wires may be filled with transparent material.

The optical device further comprises a transparent protective film coated on the surface of the magnetic material layer to keep the magnetic moments in the magnetic material layer from smearing into spaces between the wires.

The thickness of the transparent protective film may be less than 50 nm.

The wire may be formed of any one selected from the group consisting of aluminum, copper, silver, gold, barium, chromium, sodium, strontium, magnesium, and platinum.

The wire may be formed from high conductive polymer such as iodine-doped polyacetylene.

The interval of the wires may be in the range between 50 nm and 10 mm.

The thickness of the wire may be larger than the skin depth length of the wire at wavelength of interest.

The wires may be arranged to surround the magnetic material layer.

The wires may be arranged on either a top surface or a bottom surface of the magnetic material layer.

The magnetic field generating unit comprises a transparent plate electrode disposed around the magnetic material layer and a power source supplying current to the transparent electrode.

The transparent plate electrode may be formed of indium tin oxide (ITO).

The transparent plate electrode may be disposed to surround the magnetic material layer.

The transparent plate electrode may be disposed on either a top surface or a bottom surface of the magnetic material layer.

The optical device may be used as an active reflective polarizer which transmits a first polarization component of light and reflects a second polarization of light perpendicular to the first polarization component when turned on and reflects both polarization components of light when turned off.

The optical device may be used as an optical shutter which transmits light when turned on and blocks light when turned off.

According to another aspect of the present invention, there is provided a liquid crystal panel comprising: a liquid crystal layer; a front polarizer disposed on a front surface of the liquid crystal layer; and a rear polarizer disposed on a rear surface of the liquid crystal layer, wherein the rear polarizer comprises: a magnetic material layer having a plurality of magnetic particles and an insulating medium to substantially prevent agglomeration between the magnetic particles; and a magnetic field generating unit applying a magnetic field to the magnetic material layer.

According to another aspect of the present invention, there is provided a liquid crystal display comprising: a liquid crystal panel displaying an image; a backlight unit providing light to the liquid crystal panel; an active reflective polarizer disposed between the liquid crystal panel and the backlight unit; and a reflecting plate disposed under the backlight unit and reflecting light reflected by the active reflective polarizer to the liquid crystal panel, wherein the active reflective polarizer comprises: a magnetic material layer having a plurality of magnetic particles and an insulating medium to substantially prevent agglomeration between the magnetic particles; and a magnetic field generating unit applying a magnetic field to the magnetic material layer.

According to another aspect of the present invention, there is provided a backlight unit for providing light to an image display device, the backlight unit comprising: a light exit surface; and the active reflective polarizer disposed on the light exit surface.

In another aspect of the present invention, there is a method for polarizing electromagnetic energy, the method comprising: receiving electromagnetic energy at a magnetic layer; generating a magnetic field in a first direction to align magnetic moments of a plurality of magnetic particles in the magnetic layer; reflecting a component of the electromagnetic energy substantially parallel to the first direction; and transmitting a component of the electromagnetic energy substantially perpendicular to the first direction through the magnetic layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
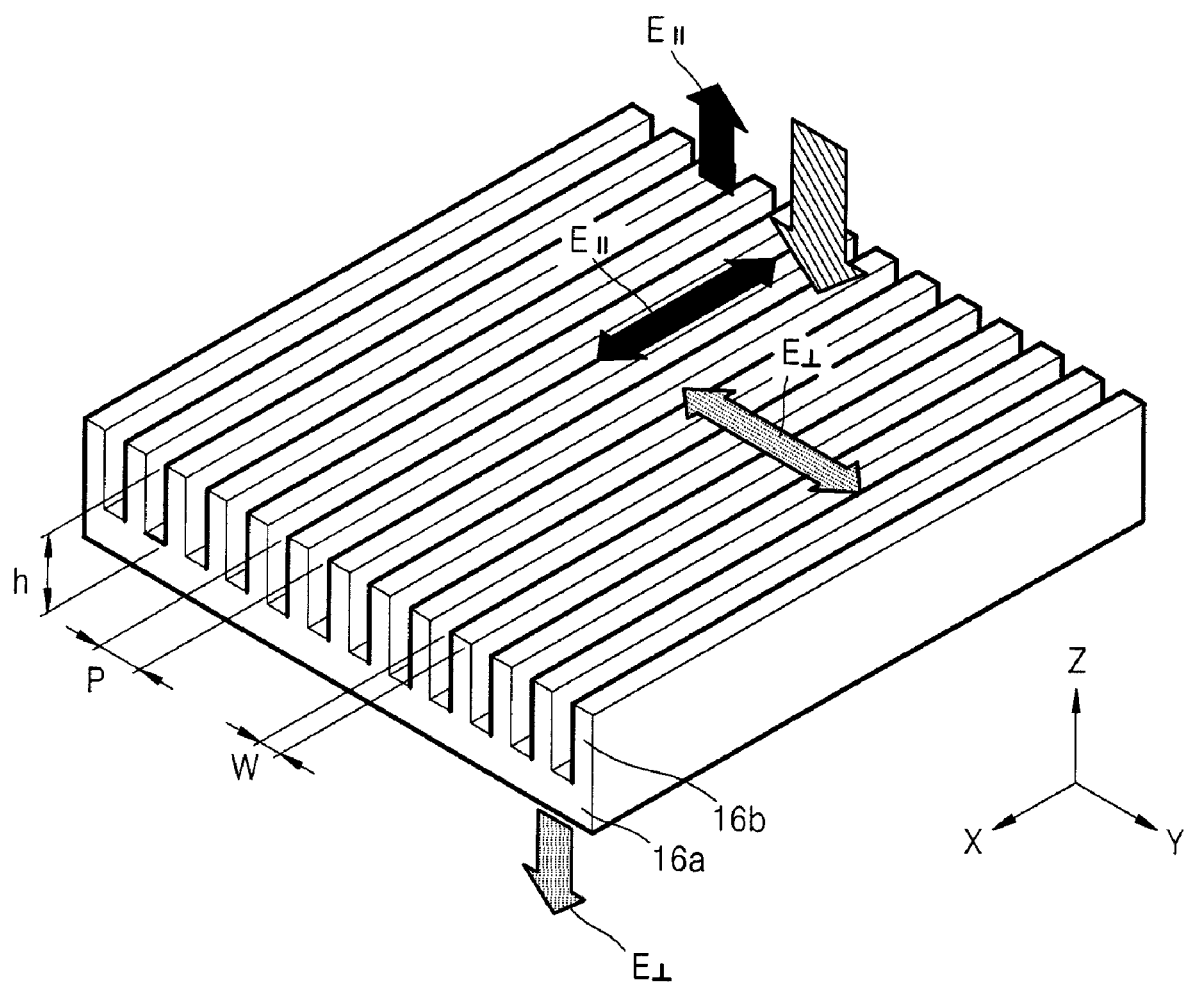
FIG. 1 is a perspective view of a conventional wire-grid polarizer.

In order to understand the operation of an active reflective polarizer according to the present invention, the principle of a wire-grid polarizer is explained. FIG. 1 is a perspective view of a wire-grid polarizer 16. The light incident on the wire-grid polarizer 16 can be separated into two polarizations $E_\parallel$ and $E_\perp$, where $E_\parallel$ is the electric field of one polarized light with its electric field parallel to the metal wires 16b, and $E_\perp$ is the electric field of the other polarized light with its electric field perpendicular to the metal wires 16b as illustrated in FIG. 1. For simplicity, we denote reflected and transmitted light by their polarizations $E_\parallel$ and $E_\perp$ for the illustration concerned with wire-grid polarizer shown in FIG. 1.

When the light $E_\parallel$ is incident on a wire-grid polarizer 16, current gets induced along the length of wire 16b, which is the direction along the X-axis. Because the source field is itself time varying, the current which gets induced along the length of a wire 16b is also time varying. According to electromagnetic radiation theory, time varying induced current produces electromagnetic waves, in which the generated electromagnetic waves travel in all directions. The electromagnetic wave traveling through the wire-grid polarizer 16, i.e., traveling in the direction of $\bar{z}$ suffers from attenuation losses as it propagates; and, provided the height $h_\parallel$ of the metal wires 16b is bigger than the skin depth length for the metal wires 16b at wavelength of interest, no polarized light of $E_\parallel$ would be transmitted through the wire-grid polarizer 16. On the other hand, the electromagnetic wave radiated in the direction of z, i.e., in the direction away from the wire-grid polarizer 16, does not suffer from any attenuation losses, and, therefore, may be thought to be fully reflected.

For the $E_\parallel$ incident on empty space between two metal wires 16b, it can be shown that electromagnetic waves suffer from attenuation loss as it travels in the $\bar{z}$ direction of effectively what is a two dimensional parallel plate waveguide. Provided the height $h_\parallel$ of wires 16b is big enough, typically, much greater than its skin depth length, the electromagnetic wave can be shown to satisfy the relation given in Equation 1.

$$E = -\nabla V - (\partial A/\partial t) = 0 \tag{1}$$

Hence, for the light of polarization $E_\parallel$, the wire-grid polarizer 16 in the ideal case performs as a perfect reflector.

For the other polarization of light $E_\perp$ incident on a metal wires 16b of wire-grid polarizer 16, its electric field also induces current along the width, i.e., the y-axis, of metal wires 16b. Since the metal wires 16b have a narrow width of approximately 50 nm, the induced current arising in the width direction of the metal wires 16b is much less than the induced current arising along the length direction of the metal wires 16b. The electromagnetic wave transmitted through the metal wires 16b suffers from attenuation losses and, provided the metal wire height $h_\perp$ is greater than the skin depth length for the metal at wavelength of interest, it does not transmit through the wire-grid polarizer. On the other hand, the magnitude of reflected wave of polarization $E_\perp$ at the surface of metal wire 16b is much smaller compared to the reflected wave associated with polarization $E_\parallel$, its contribution can be neglected.

Contrarily, for the polarization of light $E_\perp$ incident on space between two neighboring metal wires 16b of wire-grid polarizer 16, does not suffer from any attenuation losses at it propagates through the empty space. Because the light $E_\perp$ does not go through any changes in refractive index as it enters the free space between two neighboring metal wires 16b, there occurs no reflection from the wire-grid polarizer 16 when polarized light $E_\perp$ is incident on space between two neighboring metal wires 16b on wire-grid polarizer 16. Hence, for the light of polarization $E_\perp$, the wire-grid polarizer 16 in the ideal case performs as a perfect transmitter.

The wire-grid polarizer, although theoretically sound, is very difficult to manufacture at large sizes required by display devices due to difficulties previously presented in the related art. The basic idea behind the present invention comes from the fact that Poynting vector S of incoming electromagnetic energy always comes in pairs of electric field E and magnetic field H as illustrated in Equation 2.

$$S = E_\parallel \times H_\parallel + E_\perp \times H_\perp \tag{2}$$

Figure 2:
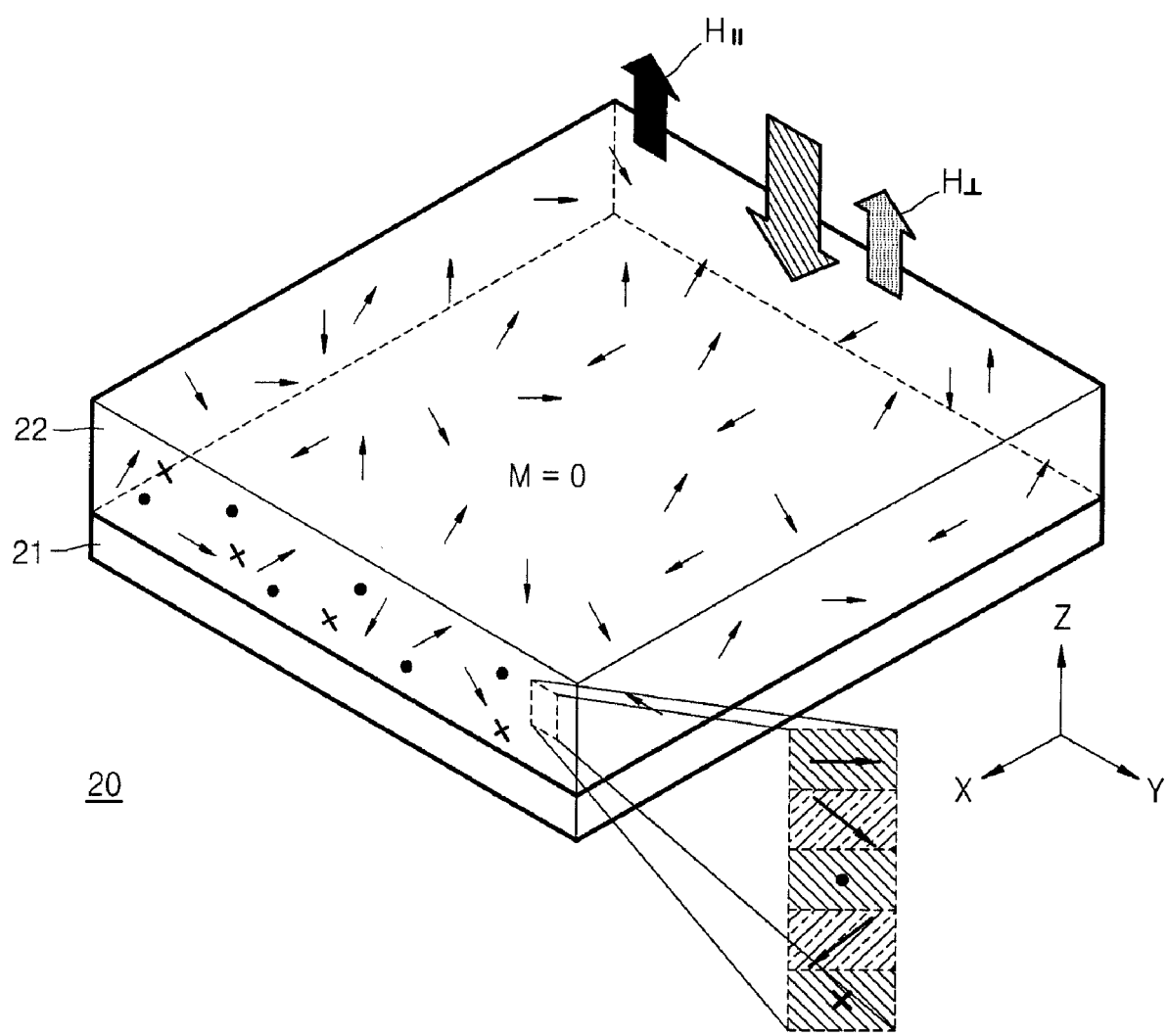
FIG. 2 is a perspective view of an active reflective polarizer according to an embodiment of the present invention when the active reflective polarizer is in an off state.
Figure 3A:
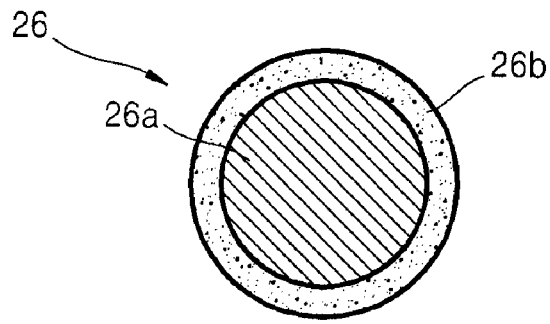
FIGS. 3A through 3D illustrate various core-shell structures of magnetic particles used in the active reflective polarizer of FIG. 2 according to embodiments of the present invention.
Figure 3B:
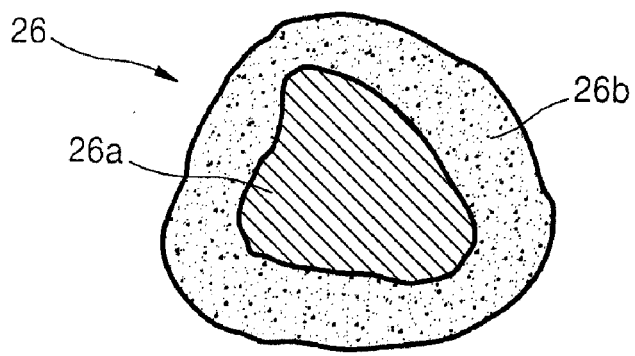
Figure 3C:
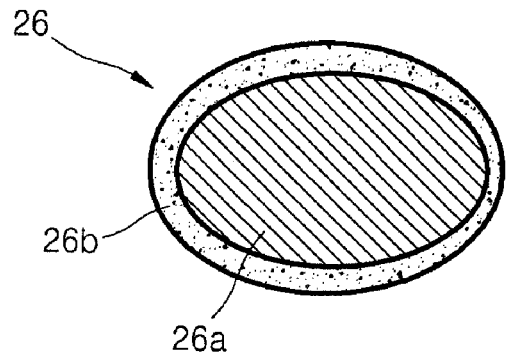
Figure 3D:
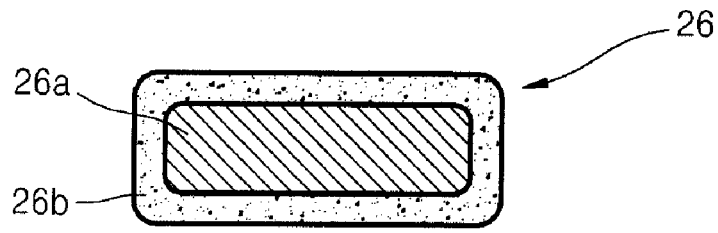
Figure 4A:
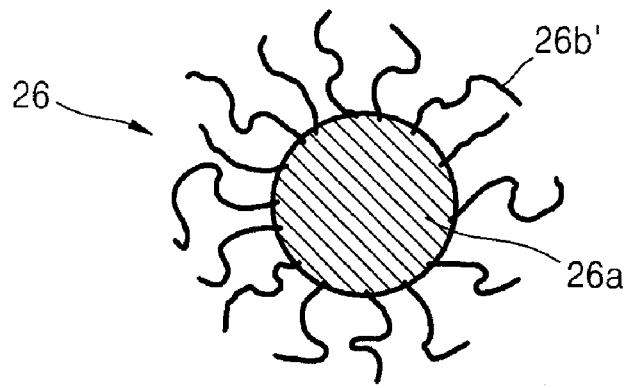
FIGS. 4A through 4D are various other core-shell structures of magnetic particles used in the active reflective polarizer of FIG. 2 according to embodiments of the present invention.
Figure 4B:
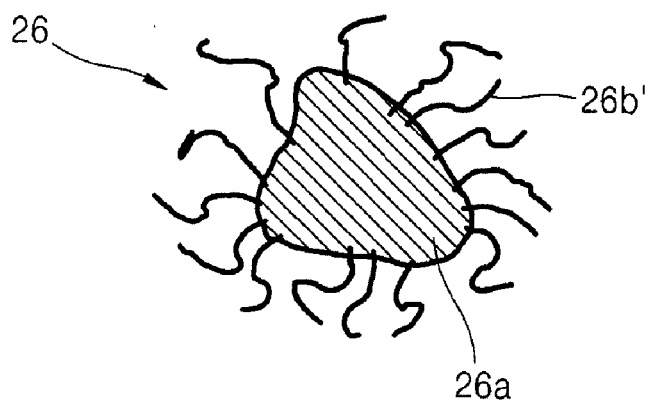
Figure 4C:
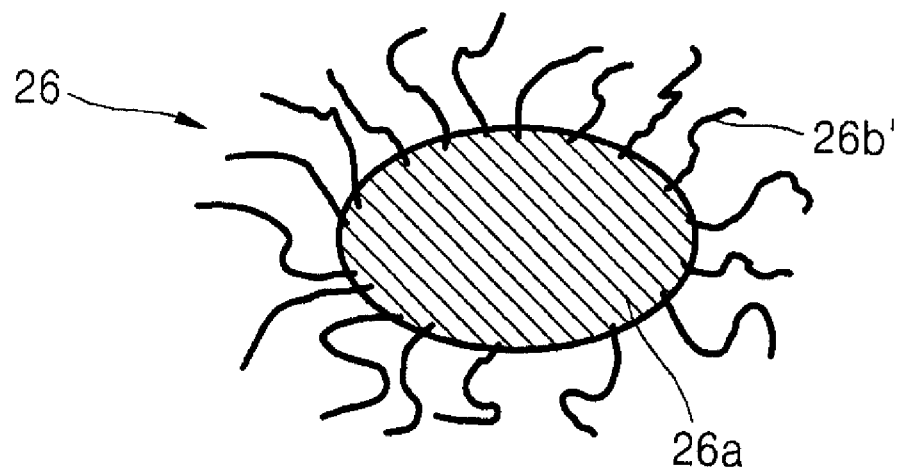
Figure 4D:
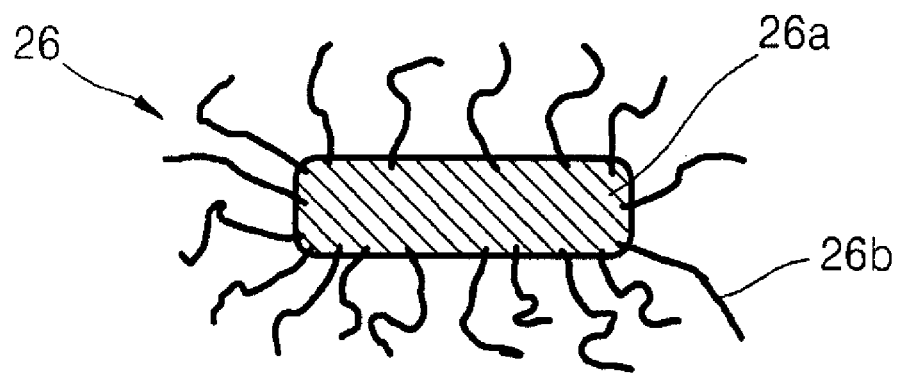

For the sake of simplicity, the reflected and transmitted electromagnetic radiation throughout the present invention have been indicated by either electric ($E_\parallel$, $E_\perp$) or magnetic field components ($H_\parallel$, $H_\perp$) of Poynting vector S of Equation 2. For example, in FIG. 1, the reflected electromagnetic radiation has been denoted by $E_\parallel$ and the transmitted electromagnetic radiation has been denoted by $E_\perp$. In FIG. 2, which is the special case of randomly oriented magnetic moments, reflected electromagnetic radiation are indicated by ($H_\parallel$, $H_\perp$); and, in FIGS. 10, 14, 15, and 16, the reflected wave is indicated by $H_\parallel$ and the transmitted electromagnetic radiation has been indicated by $H_\perp$.

In the conventional wire-grid polarizer, it is the electric field part of Poynting vector S that determines which polarization gets reflected and which gets transmitted. Contrary to the wire-grid polarizer, in the present invention, it is the magnetic field part of Poynting vector S that determines which polarization of light gets reflected and which gets transmitted through the active reflective polarizer.

FIG. 2 is a perspective view of an off state of active reflective polarizer 20 according to an embodiment of the present invention. Referring to FIG. 2, the active reflective polarizer 20 includes a magnetic material layer 22 disposed on a transparent substrate 21. The magnetic material layer 22 may be formed by embedding magnetic particles, free from agglomeration, in an insulating medium that may be in the form of toothpaste like jell state which can be spread or spin coated over transparent substrate 21. Or, the magnetic material layer 22 may be formed by immersing the core-shell type magnetic particles in a solution, and then spin coating or deep coating over the transparent substrate 21, and finally curing the resultant product. Or, the magnetic material layer 22 may be formed by directly attaching a magnetic polymer film on the transparent substrate 21.

FIGS. 3A through 3D and 4A through 4D illustrate various core-shell structures of magnetic particles 26 used in the active reflective polarizer 20 of FIG. 2 according to embodiments of the present invention. Referring to FIGS. 3A through 3D and 4A through 4D, each of the magnetic particles 26 may include a core 26a formed of a magnetic material and an insulating shell 26b or 26b surrounding the core 26a. Each of the magnetic particles 26 may have a circular, oval, square, or arbitrary shape. The magnetic core 26a of core-shell type structure representing the magnetic moments particle 26 may be ferromagnetic or superparamagnetic metals or alloys comprising any metals selected from the group consisting of cobalt, iron, and nickel, where the examples of alloys for magnetic core are cobalt-platinum ($Co_xPt_y$) and iron-platinum ($Fe_vPt_z$), wherein x, y, v and z present a composition rate; the magnetic core 26a may also be from paramagnetic metals or alloys comprising any one selected from the group consisting of titanium, aluminum, barium, platinum, sodium, strontium, magnesium, dysprosium, manganese, and gadolinium; the magnetic core 26a may be of diamagnetic metals or alloys comprising any one selected from the group consisting of silver or copper; the magnetic core 26a may be from antiferromagnetic metal such as chromium which becomes paramagnetic beyond Neel temperature; and the magnetic core 26a may also be from ferrimagnetic substances such as $MnZn(Fe_2O_4)_2$, $MnFe_2O_4$, $Fe_3O_4$, $Fe_2O_3$ and $Sr_8CaRe_3Cu_4O_{24}$, which have small or negligible electrical conductance but relatively large magnetic susceptibility.

The shell 26b or 26b in the core-shell type magnetic particles 26 prevents two cores 26a from aggregating or directly contacting each other. The shell 26b formed of an insulating materials such as $SiO_2$, $ZrO_2$, etc., may surround the core 26a as shown in FIGS. 3A through 3D. The shell 26a is not limited to $SiO_2$ or $ZrO_2$ but can be of any optically transparent dielectric materials. Alternatively, the shell 26b formed of a polymer-type insulating surfactants may surround the core 26a as shown in FIGS. 4A through 4D. In this case, it is desired that the insulating surfactants be optically transparent.

The core 26a of the core-shell type for the magnetic particles 26 may have diameters ranging from a nanometer to tens of nanometers (nm). For example, the diameter of the core 26a may range from approximately from 1 to 200 nm (but not limited to this size range only) although some difference occurs depending on the material of the core 26a. It is desired to choose the size of the core 26a such that effectively single magnetic domain exists in the core 26a. The shell 26b or 26b maybe thick enough to prevent two adjacent cores 26a from being conducted to each other.

It is reminded that the shell 26b or 26b in core-shell structure for the magnetic moments in magnetic material layer 22 is there only to keep two magnetic cores 26a from aggregating one another. If magnetic cores 26a can be dispersed in the magnetic material layer 22 free from aggregation, the shell 26b or 26b is not necessary. The previously mentioned magnetic material layer 22 formed by embedding magnetic cores, keeping from agglomeration, in an insulating medium that may be in the form of toothpaste like jell state which can be spread or spin coated over transparent substrate 21 is one example. In this case, the jell like medium act as an insulating shell for the magnetic cores, so there is no need for core-shell or any core-shell like structures.

Figure 5:
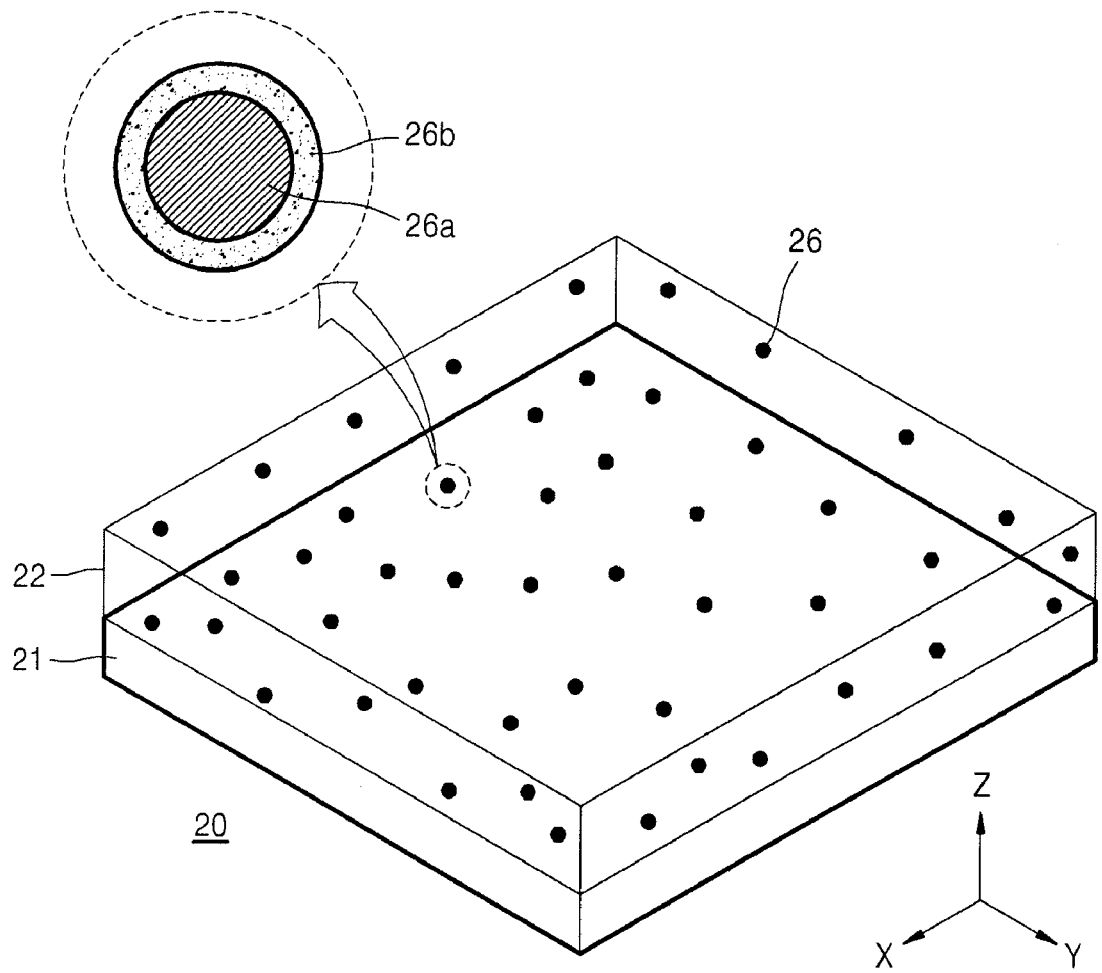
FIG. 5 is a perspective view of the active reflective polarizer of FIG. 2 having core-shell type magnetic particles distributed in a magnetic material layer according to an embodiment of the present invention.
Figure 6:
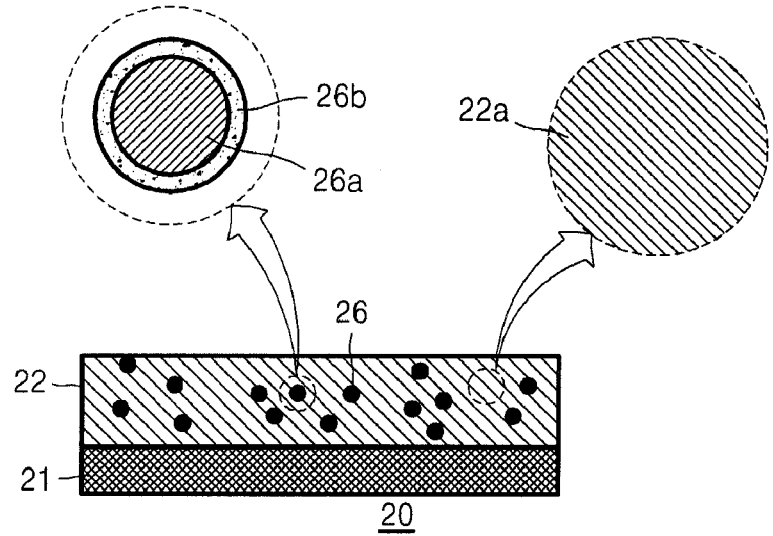
FIG. 6 is a cross-sectional view of the active reflective polarizer of FIG. 5.

FIG. 5 is a perspective view of the active reflective polarizer 20 of FIG. 2 having core-shell type magnetic particles 26 distributed in the magnetic material layer 22 according to an embodiment of the present invention. FIG. 6 is a cross-sectional view of the active reflective polarizer 20 of FIG. 5. Although magnetic particles 26 are shown to be sparsely distributed throughout the magnetic material layer 22 as illustrated in FIGS. 5 and 6, this was done deliberately for the sake of clear illustration, and in a real device, the magnetic particles 26 are densely distributed throughout the magnetic material layer 22. Referring to FIG. 6, the region 22a may be composed of transparent dielectric material such as $SiO_2$, $ZrO_2$, etc., or transparent polymers, or transparent surfactants, or any sort of transparent and insulating material which may be same or different from the material used for the shell 26b and 26b of the core-shell type 26.

Figure 7:
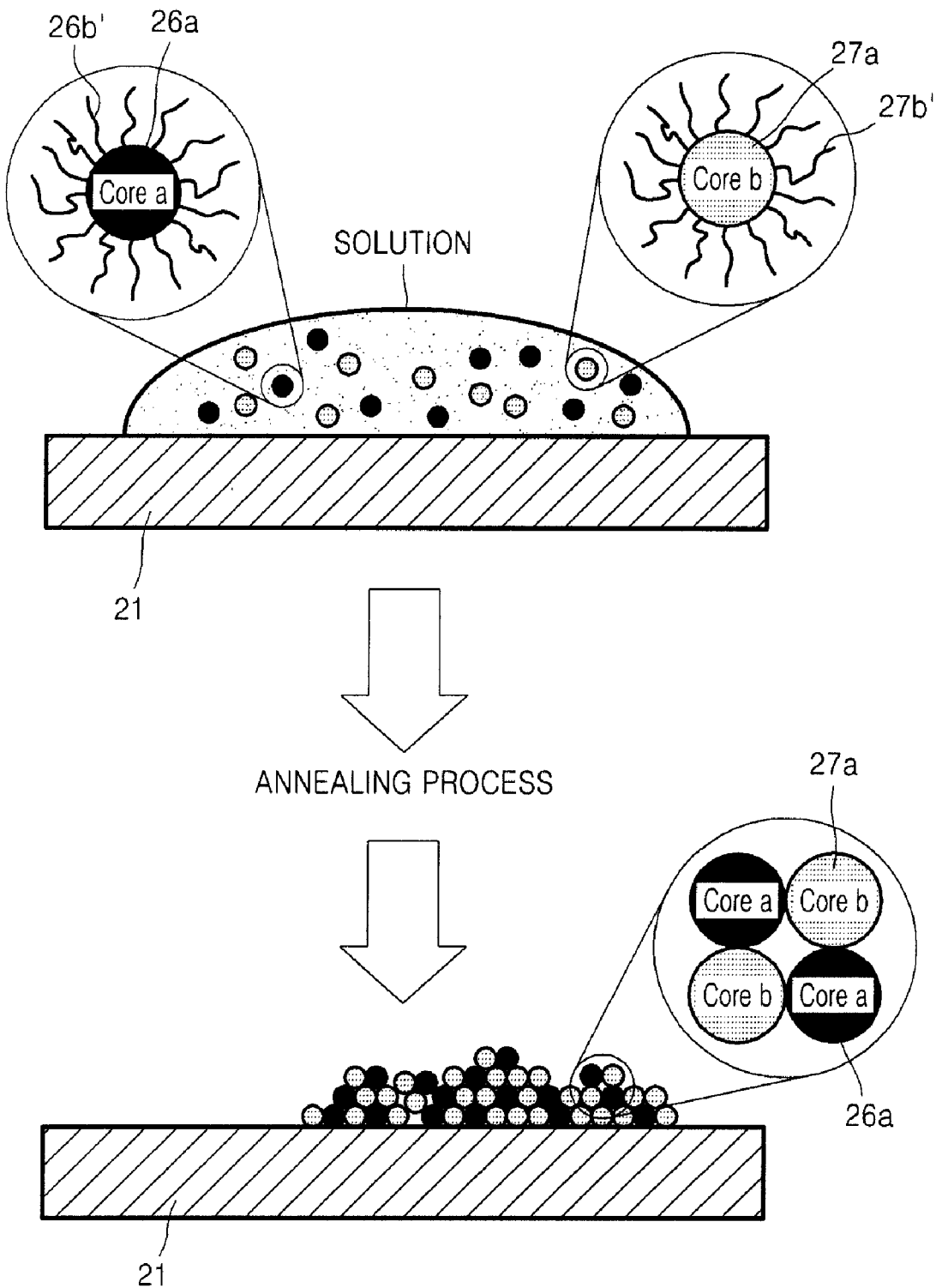
FIG. 7 shows an example of the magnetic material layer which consists of a mixture of two different types of core shells.

Alternatively, the magnetic material layer 22 may be formed by mixing different types of core-shell structures as illustrated in FIG. 7. For example, in FIG. 7, the core a 26a may be formed of magnetic material and the core b 27a may be formed of transparent and dielectric material. Examples for the core a 26a are cobalt-platinum ($Co_xPt_y$) or iron-platinum($Fe_vPt_z$), wherein x, y, v and z present a composition rate; and the examples for the core b 27a are zirconium-oxide ($ZrO_2$) or silicate ($SiO_2$). The surfactants 26b and 27b respectively attached to the surface of the cores a and b 26a and 27a can be of the same or of the different types. After mixing the two different core-shell structures into a solution, the surfactants 26b and 27b may get eliminated by the annealing process. After the annealing process, the dielectric core b 27a keeps the magnetic cores a 26a from aggregating each other as illustrated pictorially in FIG. 7. In the situation where the surfactants 26b and 27b get get eliminated during the annealing process, it is not necessary to limit the surfactants 26b and 27b from transparent ones.

The inside of magnetic cores 26a may be completely filled with magnetic material, but may contain a void or dielectric material. The magnetic cores 26a can take on any arbitrary shape so long as its volume, i.e., the volume composing magnetic material, is that of single domain size.

Figure 8:
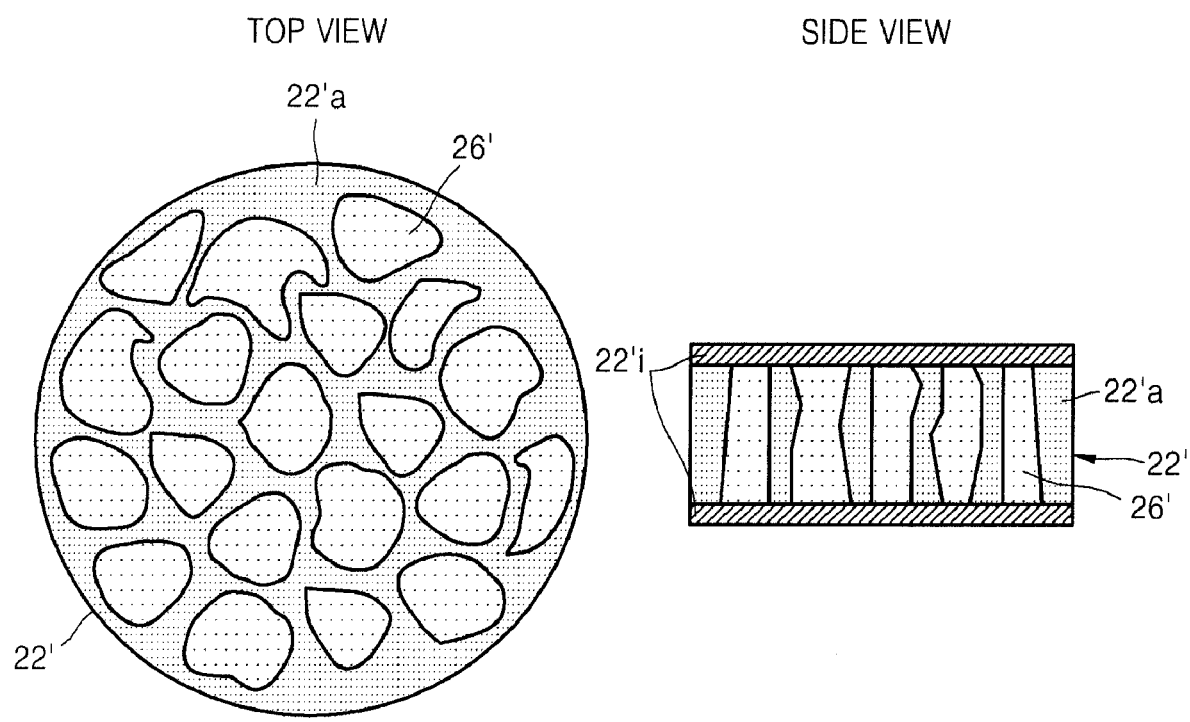
FIG. 8 shows another example of the magnetic material layer in which single domain magnetic materials are contained.

FIG. 8 shows another example of the magnetic material layer 22 in which single domain magnetic particles 26 without insulating shells are contained. The magnetic material layer 22 can be formed by sputtering method or any methods that may employ templates or pre-patterning. Under appropriate anodic oxidation conditions, very regular self-ordered, honeycomb-like hexagonal arrays with a circular pore at the centre of each hexagon can be obtained; and this structure which can be used as a template is called anodic alumina membrane (AAM) or anodic alumina oxide (AAO) or simply anodic oxide (AO).

Illustrated in FIG. 8 is magnetic material layer 22 formed by using such methods. The magnetic particles 26 in FIG. 8 can take on any arbitrary (e.g., square, rectangle, cylinder, sphere, elliptical) shape so long as the volume contained in it meets the magnetic single domain condition. Two adjacent magnetic particles 26 are well separated from each other to keep from electrical conduction. The spaces between the magnetic particles 26 may be filled with insulating material 22a Further, upper and lower surfaces of the magnetic material layer 22 are covered with insulating layers 22i respectively. In the FIG. 8, the insulating layers 22i need to be optically transparent. The magnetic material layer 22 illustrated in FIG. 8 can be cascaded in a plurality of layers to form thicker magnetic material layer. In such situation, the insulating material 22a may need to be optically transparent, unless each layer can be perfectly aligned.

Further, instead of using the single domain sized magnetic materials 26a and 26, the magnetic material layers 22 and 22 also may be formed as a thin film layer. Compared to a bulk magnetic material, where magnetic field in several Tesla is needed to saturate the material to a single domain, a thin film layer of magnetic material can be saturated to a single domain with only tenth of the magnetic field required by its bulk counterpart to saturate to a single domain. The thickness of the thin film magnetic layer may be, for example, smaller than a micrometer (μm).

Figure 9:
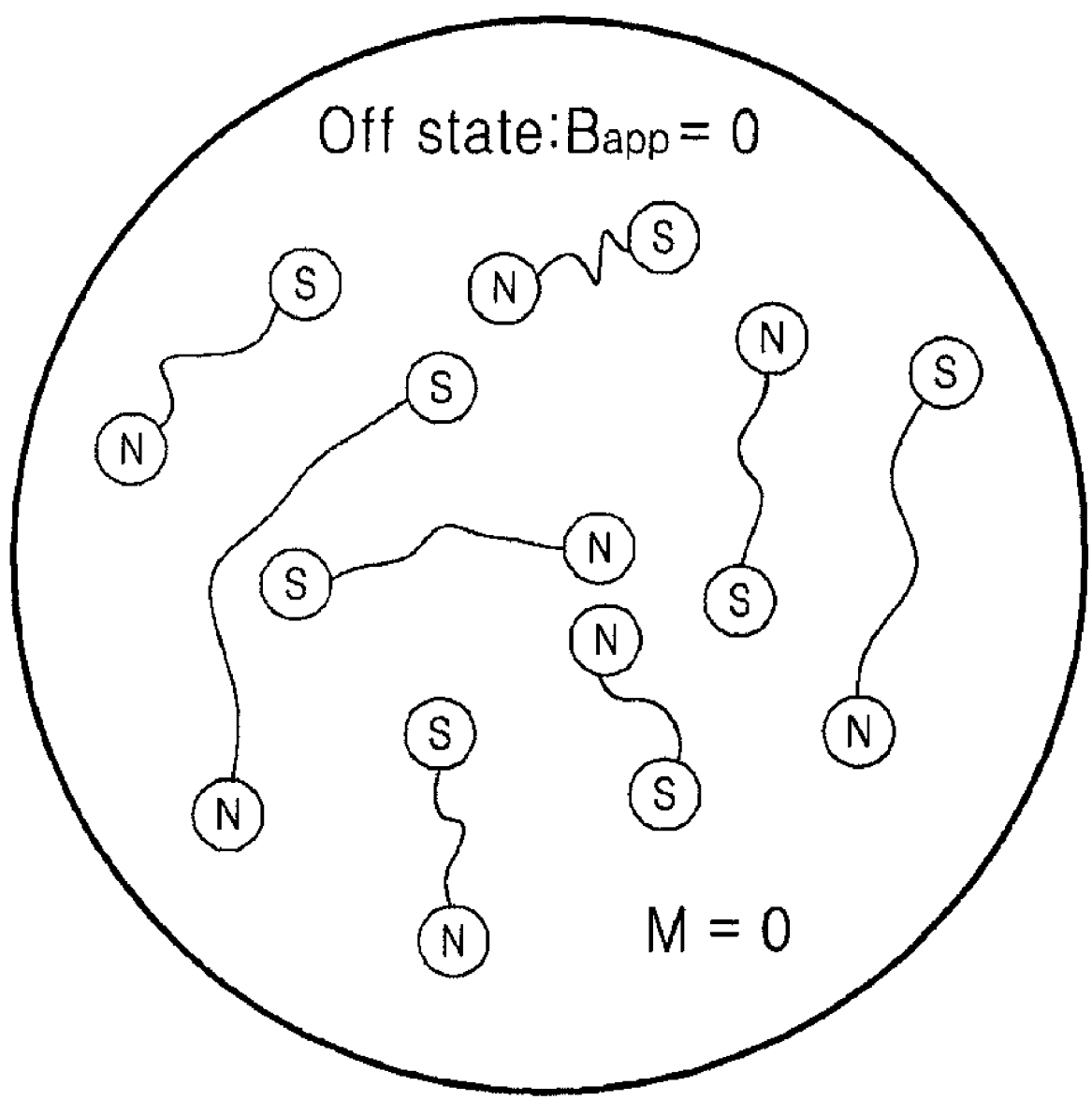
FIG. 9 illustrates magnetic polymers arranged in the active reflective polarizer of FIG. 2 when the active reflective polarizer is in the off state.

Illustrated in FIG. 2 is the situation where no external magnetic field is applied to the magnetic material layer 22. In such situation, magnetic moments in the magnetic material layer 22 are randomly oriented throughout the magnetic material layer 22 as indicated by arrows in FIG. 2. In FIG. 2, the symbol ☐·' indicates the magnetic moment pointing in +x direction, and the symbol '×☐ indicates the magnetic moment pointing in ⊠direction. The magnetic moments in the magnetic material layer 22 are randomly oriented in both vertical, i.e., the −z direction, as well as in the x-y plane which is illustrated in the enlarged segment shown in FIG. 2. For the case where magnetic material layer 22 is composed of magnetic polymers, the absence of external magnetic field, $B_{app}=0$, causes magnetic polymers to be arranged in random orientation, which makes net magnetization M=0 as illustrated in FIG. 9.

For the situation where light is incident on a magnetic medium layer 22 containing randomly oriented magnetic moments as illustrated in FIG. 4, both polarizations get reflected for following reason: as both $H_{S1}$ and $H_\perp$ propagates through the magnetic medium layer 22, both $H_\|$ and $H_\perp$ at least once runs into magnetic moment that is not fully perpendicular to $H_\|$ or $H_\perp$ and therefore results in reflection. This process continues as both $H_\|$ and $H_\perp$ propagate through magnetic medium layer 22 and by the time $H_\|$ and $H_\perp$ reaches the other end of the surface, the surviving $H_\|$ and $H_\perp$ are so small, they can be neglected.

Figure 10:
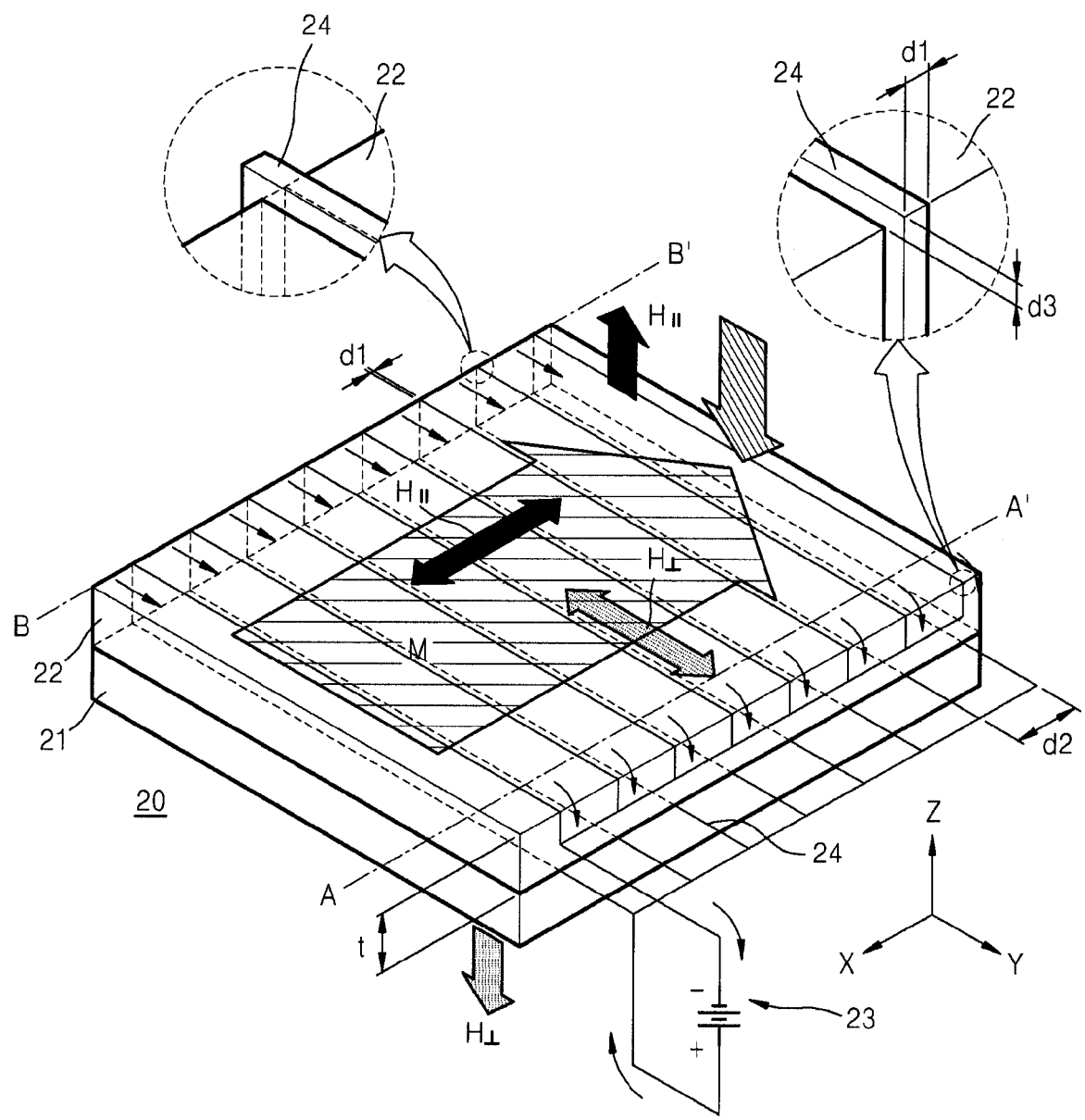
FIG. 10 is a perspective view of the active reflective polarizer of FIG. 2 when the active reflective polarizer is in an on state.
Figure 11A:
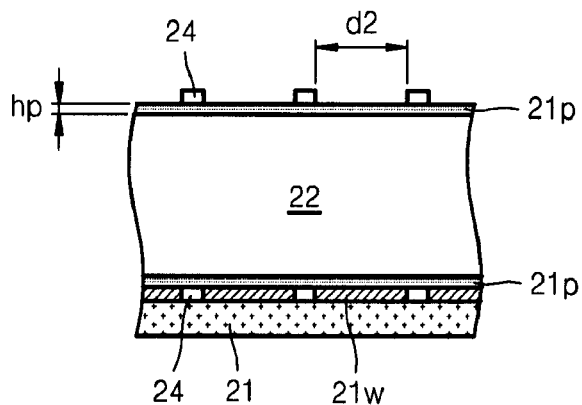
FIGS. 11A through 11F are cross-sectional views of the active reflective polarizer along the line AA□of FIG. 10 which show the various possible wire arrangements.
Figure 11B:
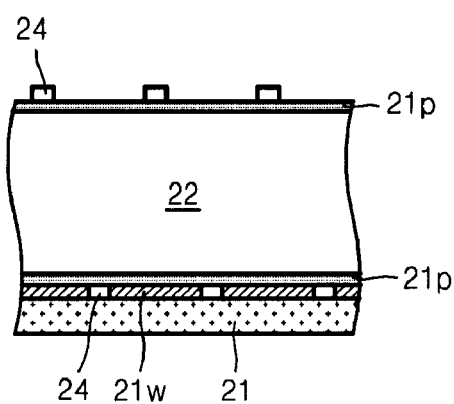
Figure 11C:
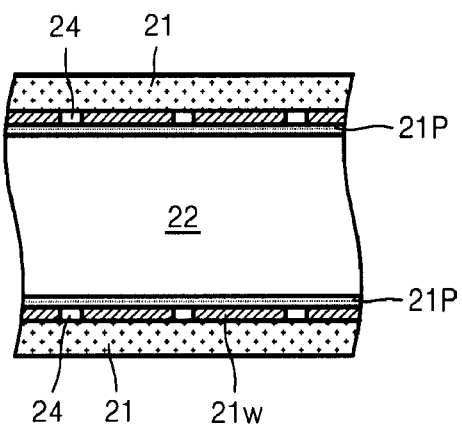
Figure 11D:
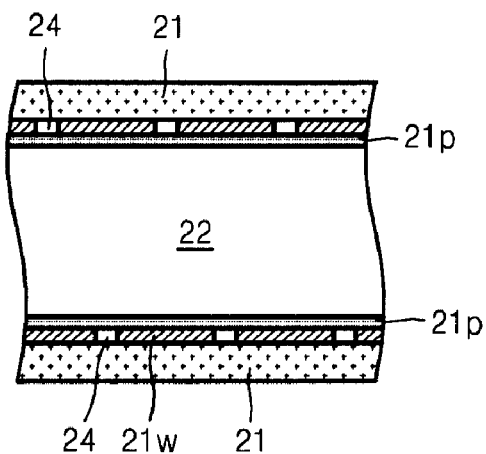
Figure 11E:
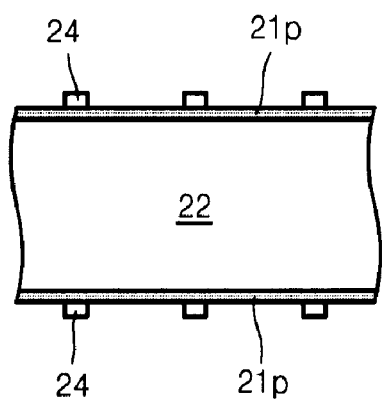
Figure 11F:
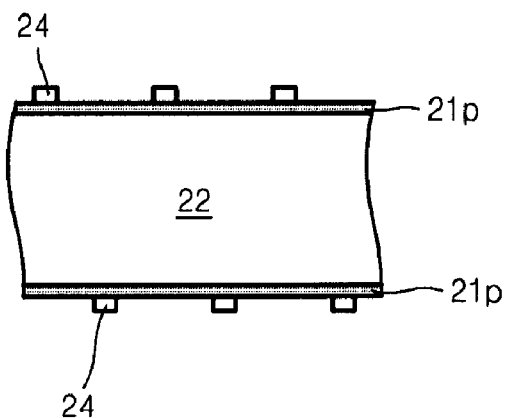

FIG. 10 is a perspective view of the active reflective polarizer of FIG. 2 when a magnetic field is applied around the magnetic material layer 22. For a magnetic field generating unit to produce magnetic field within the magnetic material layer 22, plurality of conducting wires 24 are arranged to surround the magnetic material layer 22. Each conducting wires 24 forming a loop around the magnetic material layer 22 may be placed at either regular or irregular intervals. The wires 24 may be formed of a transparent conductive material such as indium tin oxide (ITO). However, when a distance d2 between the wires 24 is bigger than or equal to the width d1 of the wires 24, the wires 24 may be selected from metals with low resistance such as aluminum, copper, gold, platinum, or silver, etc., or a conductive polymer such as iodine-doped polyacetylene. In this case, light is not transmitted through parts covered by the wires 24 but is transmitted through parts between the wires 24. If the distance d2 between the wires 24 is much greater than the width d1 of the wires 24, the light blocked by the wires 24 becomes negligible when compared with the light transmitted through the parts between the wires 24. On the other hand, if both d1 and d2 approaches the scale of, say 50 nm, the wires 24 act as a wire-grid polarizer.

FIGS. 11A through 11F shows the various possible layouts for the wires 24. FIGS. 11A through 11F give the illustration of possible cross-sectional view cut along a line AA ☐ As shown in FIGS. 11A through 11D and 11F, spaces between adjacent wires 24 disposed between the substrate 21 and the layer 21p may be filled with optically transparent dielectric material 21w. The role of the optically transparent material 21w is to prevent magnetic moments in the magnetic material layer 22 from smearing into spaces between the wires 24, where the magnetic field is either zero or very small. If the distance d2 between two wires 24 is too large, portions of the magnetic material layer 22, when placed right above the wires 24 and the optically transparent filling 21w, may not see uniform magnetic field which is parallel to the substrate 21. To make sure that magnetic material layer 22 is exposed to uniform magnetic field (i.e., magnetic field which is parallel to substrate 21) only, an optically transparent layer 21p may be added to the space between wires 24 and magnetic material layer 22. By making the layer 21p thick enough such that hp>>d2, the magnetic material layer 22 can be assured to be in region where magnetic field is uniform and whose magnetic vectors are parallel to the substrate 21. The thickness hp for the layer 21p depends on the neighboring distance d2 between two adjacent wires 24. If the wires 24 are placed at very close intervals, e.g., d2 very small, hp may be less than d2 (or may not even be necessary) and still maintain reasonably uniform magnetic fields for the magnetic material layer 22. In the absence of 21p, the optically transparent fill 21w is needed to keep magnetic moments from filling the gap between two adjacent wires 24. In the presence of 21p, the fill 21w can be avoided.

The same material used for the optically transparent substrate 21 can be used for the layers 21w and 21p. If the magnetic material layer 22 is rigid enough that no magnetic moments can smear into spaces between conductive wires 24, and that wires are spaced closed enough that magnetic material layer 22 is exposed to uniform magnetic field, then the layer 21p and 21w may be avoided.

Figure 12A:
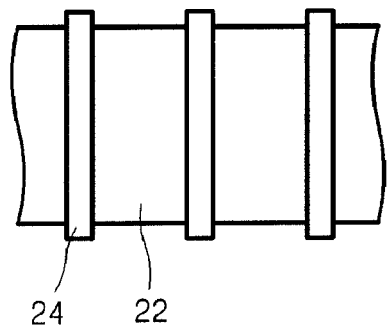
FIGS. 12A through 12D are cross-sectional views of the active reflective polarizer along the line BB□of FIG. 10 which show the various possible contact between the wires at the top and bottom surfaces of the magnetic material layer.
Figure 12B:
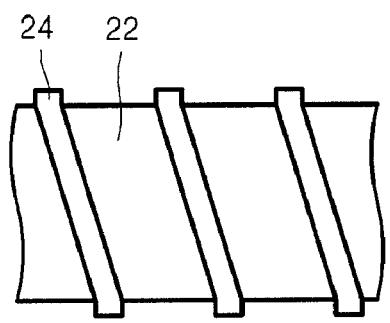
Figure 12C:
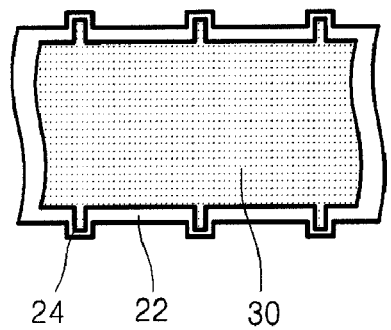
Figure 12D:
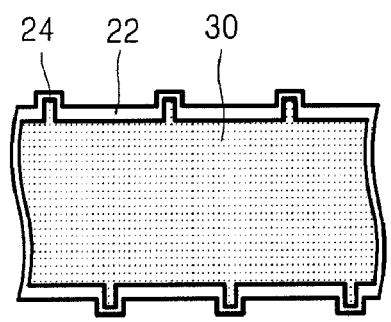

FIGS. 12A through 12D show the various possible layouts for the cross-sectional view cut along an edge line BB ☐ The edge line BB☐ represents the edge of the active reflective polarizer 20 where the wires 24 on the top and bottom surfaces of the magnetic material layer 22 are connected. As illustrated in FIGS. 12A and 12B, the contact can be established by extending one wire on the top surface of the magnetic material layer 22 to another wire on the bottom surface of the magnetic material layer 22. Similarly, as illustrated in FIGS. 12C and 12D, the entire edge can be sealed with a conductive plate 30 to connect the wires 24 on both surfaces of the magnetic material layer 22.

By connecting wires 24 at the top and bottom surfaces of magnetic material layer 22 using the scheme illustrated in FIG. 12B, a solenoid like winding of wires 24 can be achieved for the layer 22. To produce a solenoid type winding, one may apply the contact scheme illustrated in FIG. 12B to both edges of magnetic material layer 22. Here, the both edges ☐means one end represented by line BB ☐ and the other opposite end of BB ☐edge.The beginning point of solenoid winding can be connected to, say the positive of power supply, and the ending point of solenoid winding can be connected to the negative of the power supply.

Referring to FIG. 10, the current in each wire 24 induce magnetic field within the magnetic material layer 22. This induced magnetic field arranges magnetic moments in the magnetic material layer 22 such that net magnetization M is induced as indicated in FIG. 10.

Figure 13:
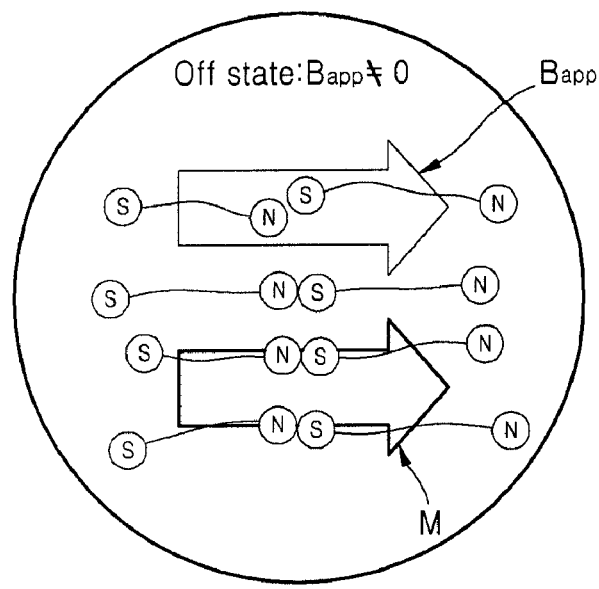
FIG. 13 illustrates molecules arranged in the active reflective polarizer of FIG. 2 when the active reflective polarizer is in the on state.

For the magnetic moments in the magnetic material layer 22, magnetic polymers can be used. Illustrated in FIG. 13 is an arrangement of magnetic polymers under the influence of external magnetic field ($B_{app}\neq 0$) which is generated by applying current to the wires 24. By aligning magnetic polymers through the use of externally applied magnetic field, the incidence light can be reflected or transmitted depending on it state of magnetic field direction as described below.

The magnetic field of electromagnetic wave can be decomposed into parallel $H_\|$ and perpendicular components $H_\perp$, where $H_\|$ and $H_\perp$ are magnetic fields that are respectively parallel and perpendicular to the magnetization M illustrated in FIG. 10. The perpendicular component $H_\perp$, when incident on the magnetic medium layer 22 in which magnetic moments are aligned in the direction of M, gets transmitted through the active reflective polarizer 20 as it does not interact with the magnetic moments. On the contrary, the parallel component $H_\|$, when incident on the magnetic medium layer 22 in which magnetic moments are aligned in the direction of M, interacts with magnetic moments and result in induced radiation. However, it suffers from attenuation loss as it propagates through the magnetic material layer 22, and as long as the thickness t of the magnetic material layer 22 is much greater than the magnetic decay length (analogous to the skin depth length for electric field), the transmitted $H_\parallel$ is negligible compared to the transmitted $H_\perp$. In summary, the magnetic field parallel to magnetization gets reflected from the active reflective polarizer 20, and the magnetic field perpendicular to the magnetization gets transmitted through the active reflective polarizer 20. Referring to Equation 2, most of light energy ($S_\parallel = E_\parallel \times H_\parallel$) associated with magnetic field parallel to magnetization M is reflected from the active reflective polarizer 20, and light energy ($S_\perp = E_\perp \times H_\perp$) associated with magnetic field perpendicular to the magnetization M is transmitted through the active reflective polarizer 20.

In case where the above-discussed core-shells are used in the magnetic material layer 22, it is necessary to make light to run into enough number of core-shells in its path of travel in order to make sure that any unwanted polarization of light gets fully attenuated in the magnetic material layer 22. It is assumed that the core-shells are uniformly and compactly distributed over a monolayer on x-y plane of the magnetic material layer 22 and a plurality of identical monolayers are stacked along z-direction of the magnetic material layer 22. Then, the number n of the core-shells that light runs into along its path of travel (or the number n of the monolayers) can be given by:

$$n \geq s/d,$$

where s is the magnetic decay length at wavelength of interest for the magnetic material layer 22 and d is the diameter of the magnetic core of the core-shells. For example, if the material for the core of core-shells has the magnetic decay length of 35 nm at wavelength of interest and core diameter is 7 nm, the light must at least run into 5 core-shells along its path of travel or 5 monolayers may be required.

Meanwhile, the plurality of the wires 24 on the upper and the lower surfaces of magnetic material layer 22 resemble the wire-grid polarizer illustrated in FIG. 1. Effectively, it can be considered that the active reflective polarizer 20 as illustrated in FIG. 10 is a magnetic material layer 22 sandwiched between two wire-grid polarizers, one at the top and the other at the bottom surfaces of magnetic material layer 22.

In the conventional wire-grid polarizer 16 shown in FIG. 1, which polarization of light gets reflected and which gets transmitted is solely determined by the electric field E. If one designates $E_\parallel$ as the electric field component parallel to the conductive wire grids, and designate $E_\perp$ as the electric field component perpendicular to the conductive wire grids, the reflected light is represented by the Poynting vector relation $S_\parallel = E_\parallel \times H_\parallel$ and the transmitted light is represented by $S_\perp = E_\perp \times H_\perp$, where $S = S_\parallel + S_\perp$. Because the magnetic field components do not take part in determining what gets reflected or transmitted in wire-grid polarizer, for a wire-grid polarizer 16 to effectively work as a polarizer at visible wavelength ranges, the gratings formed by periodic arrangement of conductive wires 16b have period of less than 100 nm or so; and the wire height □h□in FIG. 1 has to be greater than the skin depth length at wavelength of interest. Here, the skin depth length is not to be confused with magnetic decay length, of course. This stringent requirement for the grating period makes wire-grid polarizer a very difficult technology to adopt in industry.

The magnetic material layer 22, when the magnetic moments confined in it are arranged in prescribed direction, reflects or transmits light depending on the state of the orientation of magnetic field the light possess during interaction. If we designate $H_\parallel$ as the magnetic field component of light which is parallel to the magnetization M, and designate $H_\perp$ as the magnetic field component of light which is perpendicular to the magnetization M, the reflected light has the Poynting vector given by $S_\parallel = E_\parallel \times H_\parallel$ and the transmitted light has the Poynting vector $S_\perp = E_\perp \times H_\perp$. For what is concerned with magnetic moments in the magnetic material layer 22, it is the magnetic field ($H_\parallel$, $H_\perp$) that determines which light gets reflected and which light gets transmitted, not the electric field components ($E_\parallel$, $E_\perp$).

For the magnetic material layer 22 to work as a polarizer, it requires a scheme to induce external magnetic field to align magnetic moments in it. One of the many possible schemes to just do this is as illustrated in FIGS. 10, where gratings of conductive wires 24 were placed at the surfaces of magnetic material layer 22 and current was allowed to run through the wires 24. This, of course, is the current invention which we referred to as □active reflective polarizer □ throughout the work. When light in incident on active reflective polarizer 20, the reflected light $S_\parallel = E_\parallel \times H_\parallel$ and the transmitted light $S_\perp = E_\perp \times H_\perp$ may have both of their electric and magnetic field components participate in the process. For example, in the case of reflected light, $S_\parallel = E_\parallel \times H_\parallel$, the $E_\parallel$ contribution may come from the gratings of the conductive wires 24 and the $H_\parallel$ contribution may come from the aligned magnetic moments in magnetic material layer 22. Similarly, in the case of transmitted light, $S_\perp = E_\perp \times H_\perp$, the $E_\perp$ passes right through the gratings of the conductive wires 24 as it is perpendicular to the conductive wires 24, and $H_\perp$ passes right through the magnetic material layer 22 as it is perpendicular to magnetic moments.

Accordingly, it is more preferable, but not necessary, that the height □d3□of the wires 24 in FIG. 10 is greater than the skin depth length for the material used for the wires 24 at wavelength of interest. In this case, because both $E_\parallel$ and $H_\parallel$ participate in the active reflective polarizer 20, any deficiencies arising in either $E_\parallel$ (or $H_\parallel$) can be compensated by $H_\parallel$ (or $E_\parallel$). For example, since wire-grid polarizer with 100 nm or lesser grating period is very difficult to fabricate, we may settle for the wires 24 with its grating period ranging anywhere from 500 nm to 10 mm. This increased period in grating, however, bring forth a deficiency in $E_\parallel$, which affects the over all performance of wire-grid polarizer as a suitable optical field polarizer. In the active reflective polarizer 20, the deficiency in $E_\parallel$ may be compensated in $H_\parallel$ by making magnetic material layer 22 denser with magnetic moments. Similarly, we may as well do such discussed process in reverse, where degrading the quality of magnetic material layer 22 thereby bringing forth a deficiency in $H_\parallel$. This deficiency in $H_\parallel$ can be compensated in $E_\parallel$ by making the grating period for conductive wires 24 as small as possible, which increases the performance of $E_\parallel$.

Figure 14:
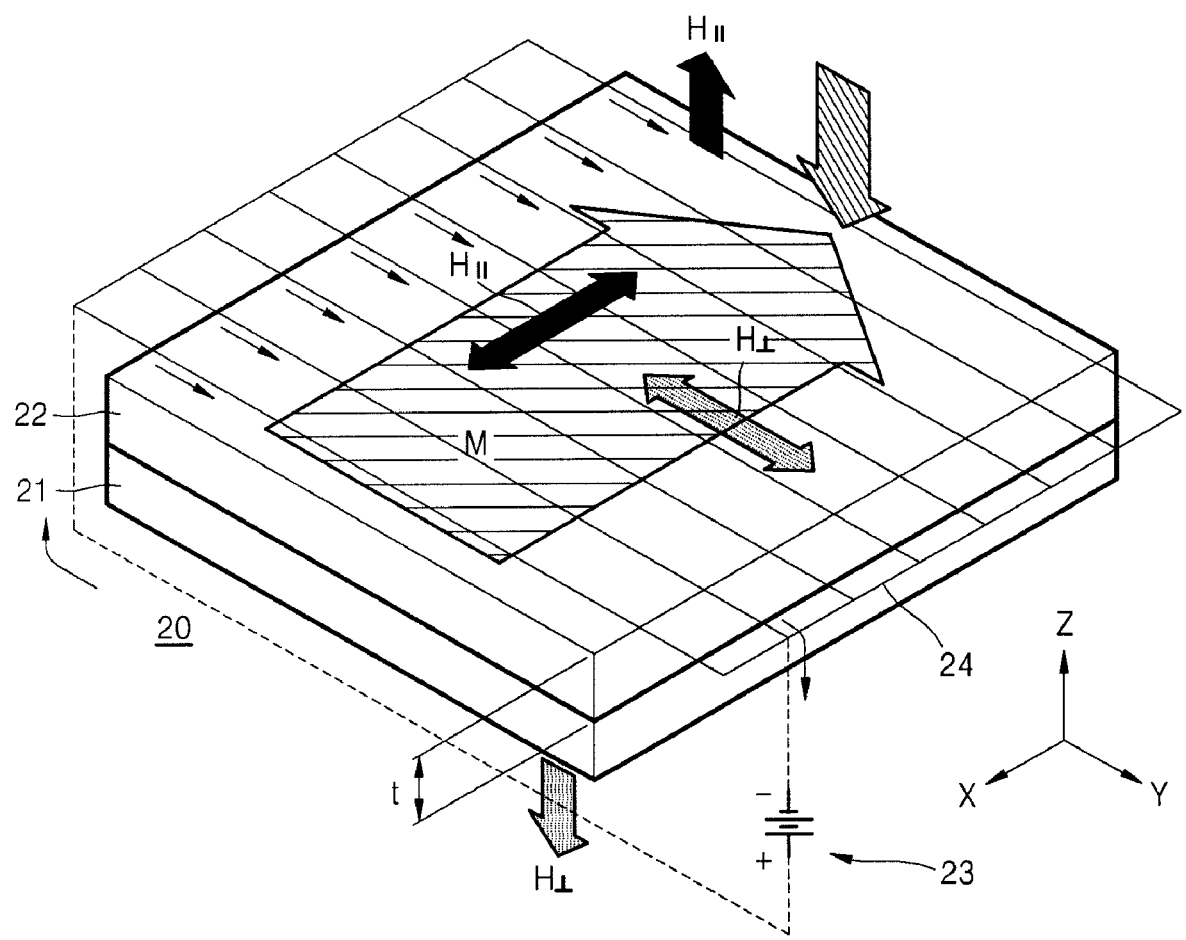
FIG. 14 is a perspective view illustrating a modification of the active reflective polarizer of FIG. 10.

FIG. 14 is yet another perspective view of generating magnetic field using wire configuration to align magnetic moments. Unlike the illustration shown in FIG. 10, the currents are allowed through the wires 24 placed on only one side of magnetic material layer 22. Because the thickness of magnetic material layer 22 is in the order of only few microns or less at the maximum, and knowing the fact that generated magnetic field from each wire 24 has inverse distance squared relation, the configuration illustrated in FIG. 14 can easily generate magnetic field of sufficient strength to align magnetic moments in the magnetic material layer 22.

Figure 15:
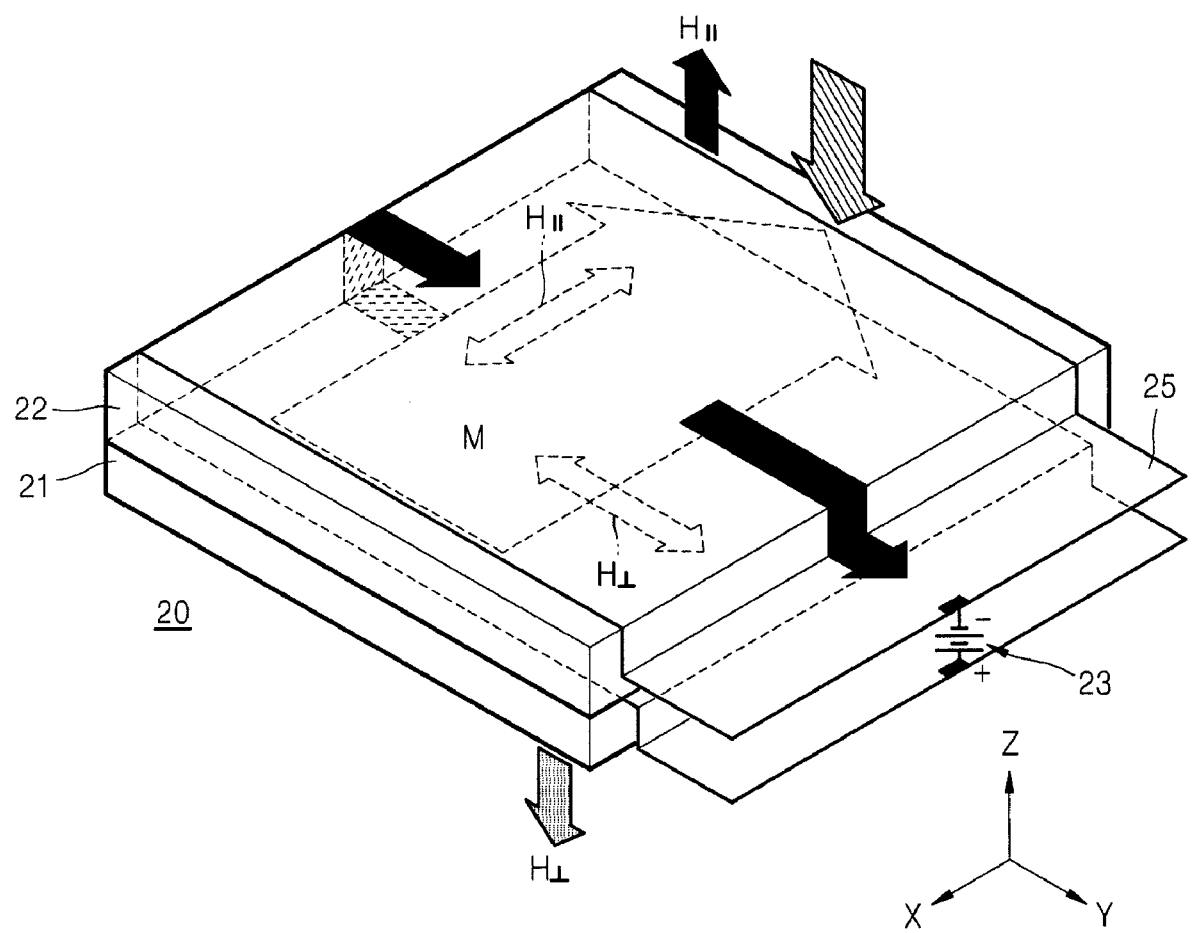
FIG. 15 is a perspective view of an active reflective polarizer according to another embodiment of the present invention.

As yet another embodiment for generating external magnetic field to align magnetic moments in magnetic medium layer 22, a transparent plate electrode 25 disposed around the magnetic material layer 22 may be used as the magnetic field generating unit as shown in FIG. 15. FIG. 15 is a perspective view of an active reflective polarizer according to another embodiment of the present invention. The transparent electrode 25 may be formed of a transparent conductive material such as ITO. However, a very thin metal film formed of high conductive metals such as aluminum, copper, silver, gold, platinum, etc. may be used as the transparent electrode 25. When optically non-transparent metals such as aluminum, copper, silver, gold, platinum, etc, are coated to a thickness less than their electric skin depth length, they become optically transparent. The active reflective polarizer using the transparent plate electrode 25 may introduce more uniformity in arranging magnetic moments than the wires scheme of FIGS. 10 and 14.

Figure 16:
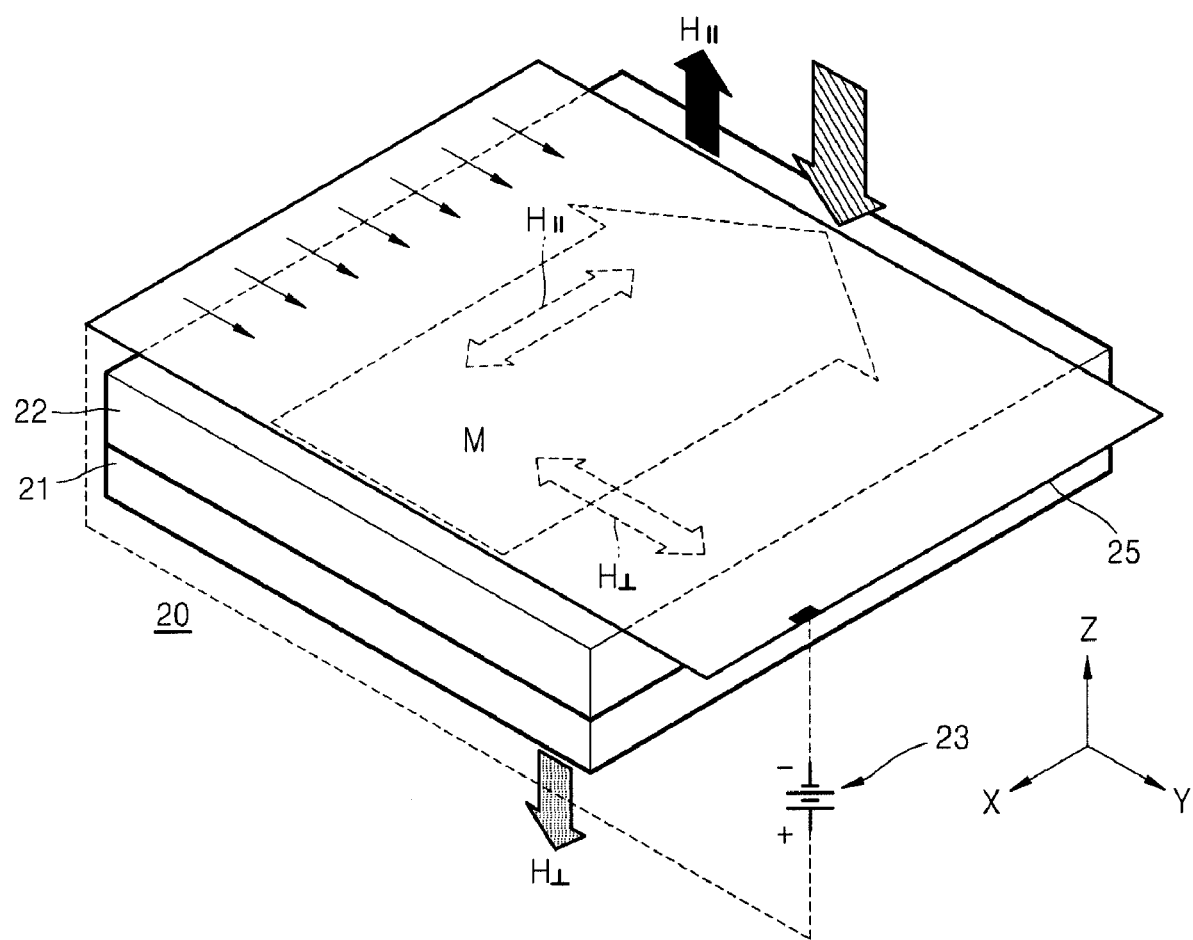
FIG. 16 is a perspective view illustrating a modification of the active reflective polarizer of FIG. 15.

While the transparent plate electrode 25 entirely surrounds the magnetic material layer 22 in FIG. 15, the transparent plate electrode 25 may partially surround the magnetic material layer 22 as shown in FIG. 16. In FIG. 16, the transparent plate electrode 25 may be disposed on either the top surface or the bottom surface of the magnetic material layer 22 and still produces a sufficient external magnetic field to align magnetic moments in the magnetic material layer 22.

Alternatively, there may be other means for generating the magnetic field known in the art.

In another aspect of the present invention, there is a method for polarizing electromagnetic energy according the above operations. In one embodiment, the method comprises receiving electromagnetic energy at a magnetic layer; generating a magnetic field in a first direction to align magnetic moments of a plurality of magnetic particles in the magnetic layer; reflecting a component of the electromagnetic energy substantially parallel to the first direction; and transmitting a component of the electromagnetic energy substantially perpendicular to the first direction through the magnetic layer.

Figure 17:
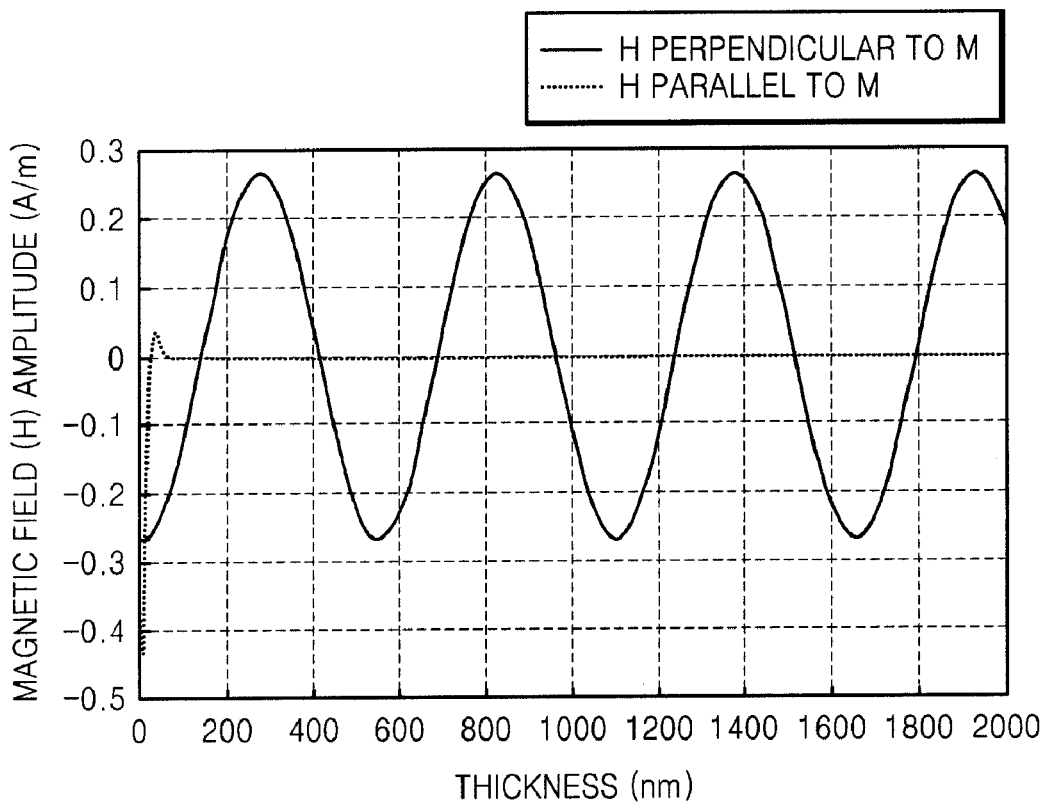
FIGS. 17 and 18 are graphs illustrating a magnetic field through the active reflective polarizer according to an embodiment of the present invention.
Figure 18:
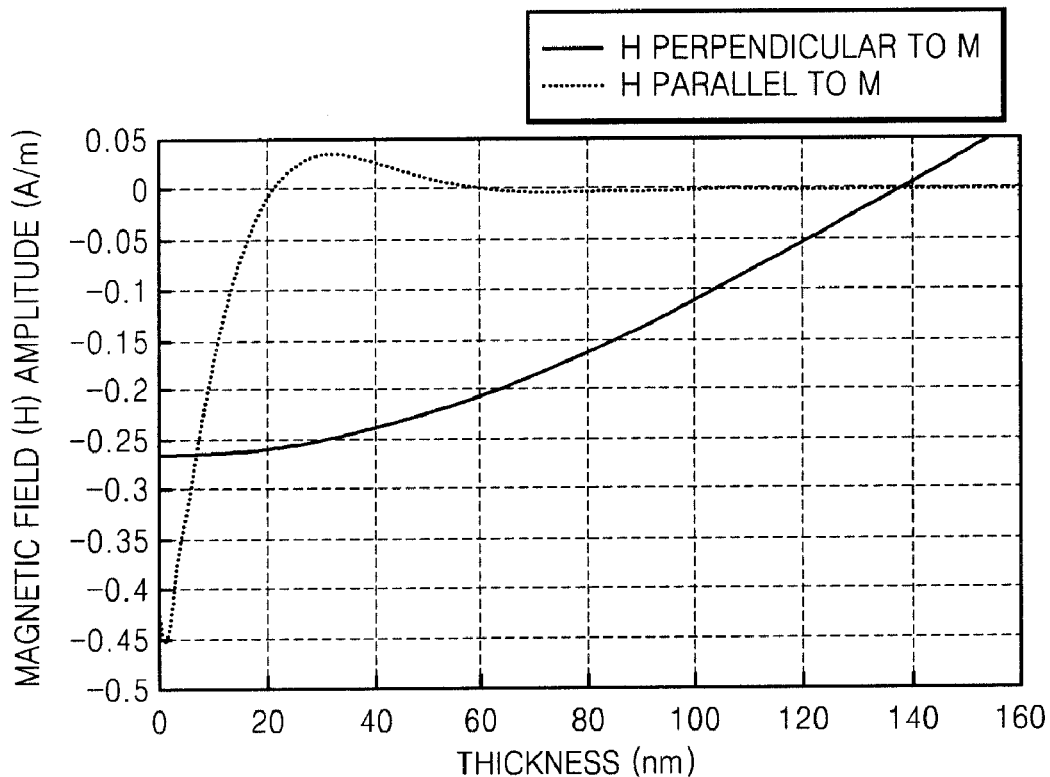

FIG. 17 is a graph illustrating a time-varying magnetic field (A/m) through the active reflective polarizer 20 according to an embodiment of the present invention. FIG. 18 is an enlarged view of a part of the graph of FIG. 17. In the calculation which produced graphs shown in FIGS. 17 and 18, electric conductivity and magnetic susceptibility for the magnetic cores in magnetic material layer 22 were that of titanium for convenience. The electric conductivity and magnetic susceptibility values were deliberately obtained from titanium since, titanium, though it has relatively high electric conductivity, its magnetic susceptibility is small as it is a paramagnetic material. In other words, if it works for titanium-based magnetic moments, it surely would work for magnetic moments based on much better magnetic cores. Further, it is assumed that incident light has a wavelength of approximately 550 nm and an intensity of approximately 100 V/m. It is known that titanium has an electrical conductivity of approximately $2.38 \times 10^6$ S where S=Siemens and a magnetic susceptibility of approximately $18 \times 10^{-5}$ at a room temperature of 20° C. In the theoretical calculation for generating graphs of FIGS. 17 and 18, the titanium cores were allowed to have diameter of 1 nm for convenience and each titanium cores were assumed to be perfectly insulated from one another. Referring to FIGS. 17 and 18, the light with its magnetic field perpendicular to the magnetization M of the magnetic material layer 22 is transmitted through the active reflective polarizer 20 without any attenuation losses regardless of the increased thickness in the magnetic material layer 22. On the contrary, the light with its magnetic field parallel to the magnetization M of the magnetic material layer 22 is drastically attenuated with its amplitude nearing 0 at roughly 60 nm or so. Because the titanium core was assumed to have diameter of 1 nm, the 60 nm can be interpreted as light having gone through 60 titanium cores. Accordingly, when the magnetic material layer 22 is formed of titanium and the thickness of the magnetic material layer 22 is greater than 60 nm, near complete polarization separation for the light having the wavelength of 550 nm can be achieved.

Figure 19:
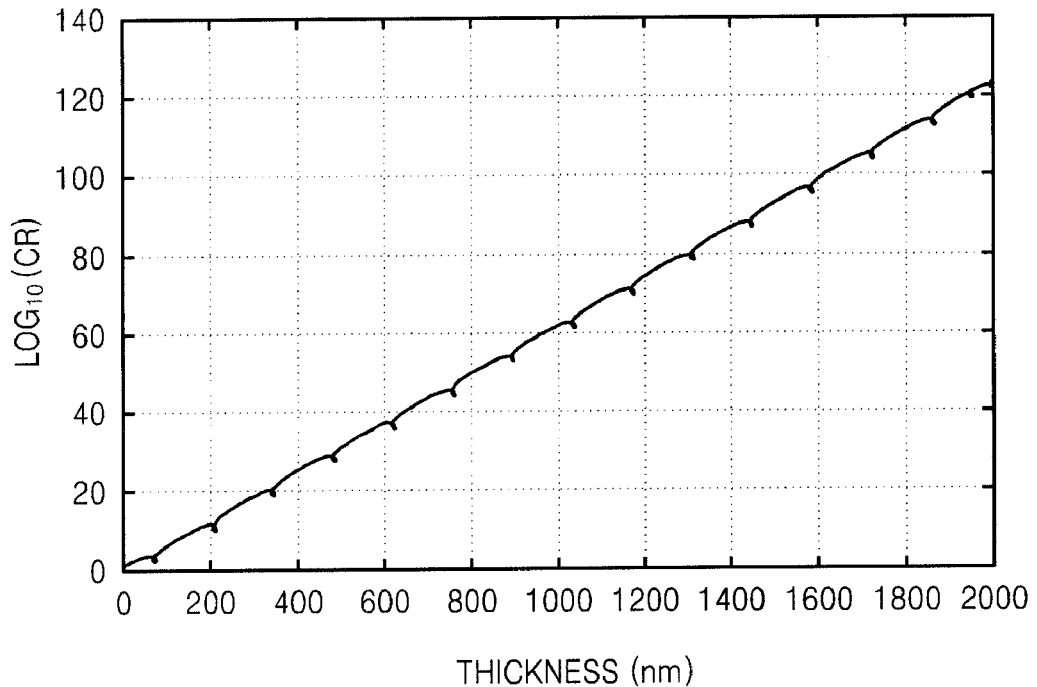
FIG. 19 is a graph illustrating logarithm values of the ratio of the transmittance of light perpendicular to the active reflective polarizer to the transmittance of light parallel to the active reflective polarizer according to an embodiment of the present invention.
Figure 20:
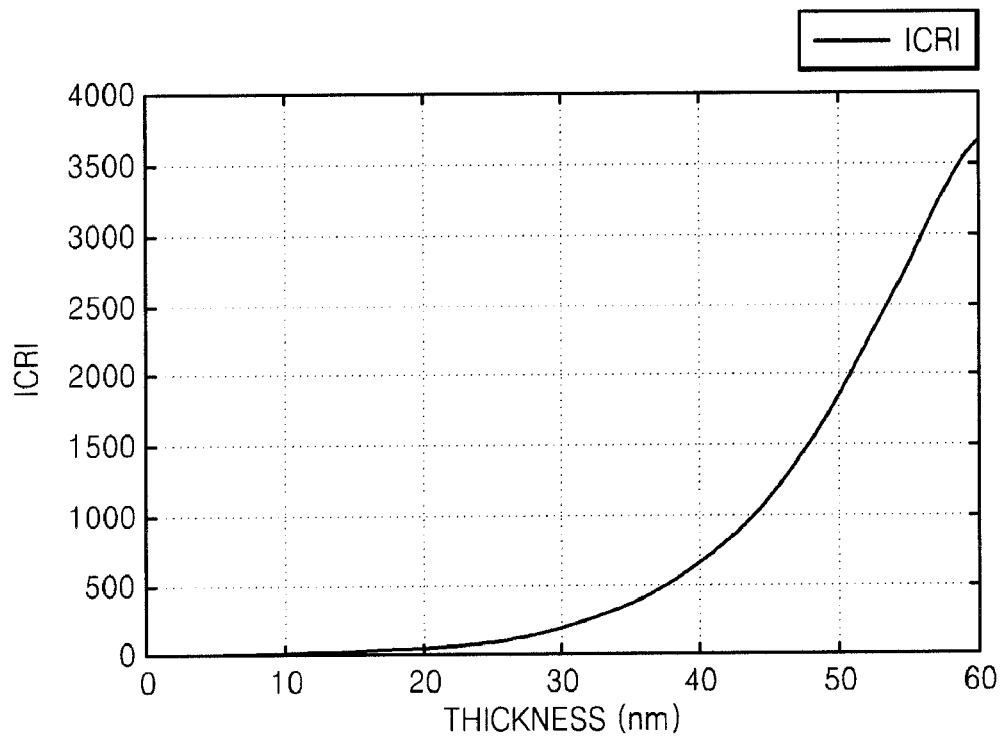
FIG. 20 is a graph illustrating absolute values of the ratio of the transmittance of light parallel to the active reflective polarizer to the transmittance of light perpendicular to the active reflective polarizer according to an embodiment of the present invention.

FIG. 19 is a graph illustrating the $\log_{10}$ CR of a contrast ratio CR and FIG. 20 is a graph illustrating |CR| of the contrast ratio CR. Contrast ratio CR is the ratio of the transmittance of light with its magnetic field perpendicular to the magnetization M of active reflective polarizer 20 to the transmittance of light with its magnetic field parallel to the magnetization M of active reflective polarizer 20. For example, if "W1" is the light desired to be transmitted and "W1" is the undesired light that got somehow transmitted, the contrast ratio CR is defined as W1/W2. In the active reflective polarizer 20 according to the present embodiment, "W1" is $S_\perp = E_\perp \times H_\perp$ and "W2" is $S_\parallel = E_\parallel \times H_\parallel$. Referring to FIGS. 17 and 18, as the thickness of the magnetic material layer 22 is increased, the transmittance of the light with its magnetic field parallel to the magnetization M decreases and the transmittance of light with its magnetic field perpendicular to the magnetization M remains constant. Accordingly in FIGS. 19 and 20, it shows the increased contrast ratio as the thickness of magnetic material layer 22 is increased. For the core-shell 26 of magnetic moments shown in FIGS. 3A through 3D, where the metallic core 26a is that of titanium with its diameter being approximately 1 nm, the thickness of the magnetic material layer 22 does not need to exceed 45 nm in order to obtain a contrast ratio CR of greater than 1000.

Magnetic moment responds to the magnetic field by aligning itself parallel to the applied magnetic field for the case of ferromagnetic, paramagnetic, and superparamagnetic origins. For the case of diamagnetic origins, magnetic moment responds to applied magnetic field by aligning in the opposite direction of the field. The magnetic field component of light, from the view of magnetic moment, is no different from externally applied magnetic field from the conductive wire 24 or the transparent plate electrode 25 encapsulating the magnetic material layer 22. If the direction of the magnetic moments of the magnetic material layer 22 can be easily influenced by incident light, the performance of the active reflective polarizer 20 may be degraded. Simple calculation shows, however, even for a magnetic moment with its moment of inertia as small as $1 \times 10^{-15}$ kg·m², once aligned via externally applied magnetic field, this alignment is hardly influenced by the magnetic field component of incoming light, which is illustrated in FIG. 21.

Figure 21:
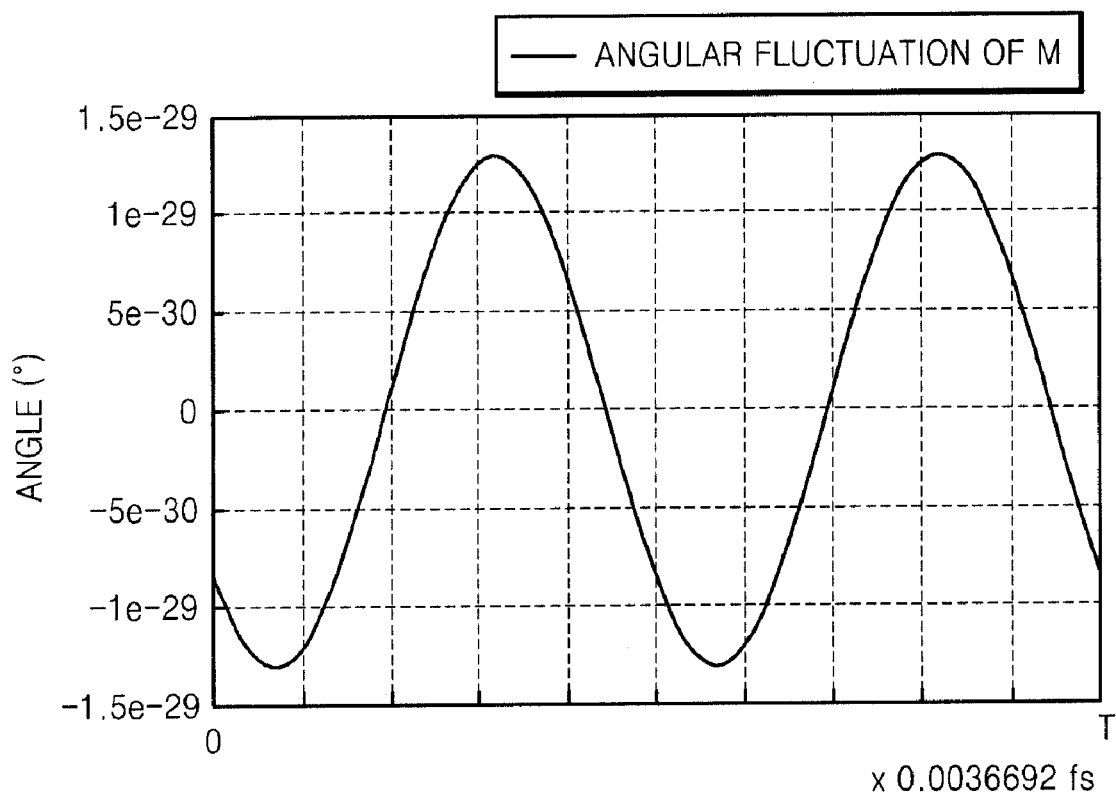
FIG. 21 is a graph illustrating the angular fluctuation of magnetic moments in response to the incident light.

FIG. 21 is a graph illustrating the angular fluctuation of magnetic moment as it responds to the magnetic field of incident light. For the calculation shown in FIG. 21, each magnetic moment in the magnetic material layer 22 was assigned magnetic moment value of $1 \times 10^{-15}$ kg·m² and the magnetic moments have been initially aligned using externally applied magnetic field of strength $H_{app} \sim 265$ A/m. The incoming light was chosen to have wavelength of 550 nm and was given enough power of 1327 W. The unit for the vertical axis of the graph of FIG. 21 is in degrees and the unit for the horizontal axis of the graph of FIG. 21 is the time in femtoseconds (fs) which must be multiplied by factor 0.0036692. Referring to FIG. 21, since the incident light is a sinusoidal wave of predetermined period, the angular fluctuations in the orientation of magnetic moments varies in the form of a sinusoidal wave in accord with the amplitude of the incident light. The angular fluctuation for the magnetic moments in response to the incident light had a period of 1.8346 fs. As can be seen from FIG. 21, the peak amplitude in the angular fluctuation of magnetic moments due to the influence of incident light is very low that its effect can be neglected from further consideration. That is, the angular fluctuation of the magnetic moments due to the incident light is negligible.

As described above, in the case of the active reflective polarizer 20 constructed as described above according to the present invention, the magnetic material layer 22 can be formed by mixing the core-shell type magnetic particles 26 with the paste-state insulating material and coating and curing the resultant product on the transparent substrate 21, by immersing the core-shell type magnetic particles 26 in the solution and coating and curing the resultant product on the transparent substrate 21, or by directly attaching the currently available magnetic polymer film on the transparent substrate 21. Accordingly, the active reflective polarizer 20 according to the present invention can be more easily manufactured than the wire-grid polarizer in which very thin metal wires are arranged at small intervals on the transparent substrate. Furthermore, the active reflective polarizer 20 according to the present invention is not sized limited from the perspective of manufacturing process. It can be easily manufactured in any sizes.

Figure 22:
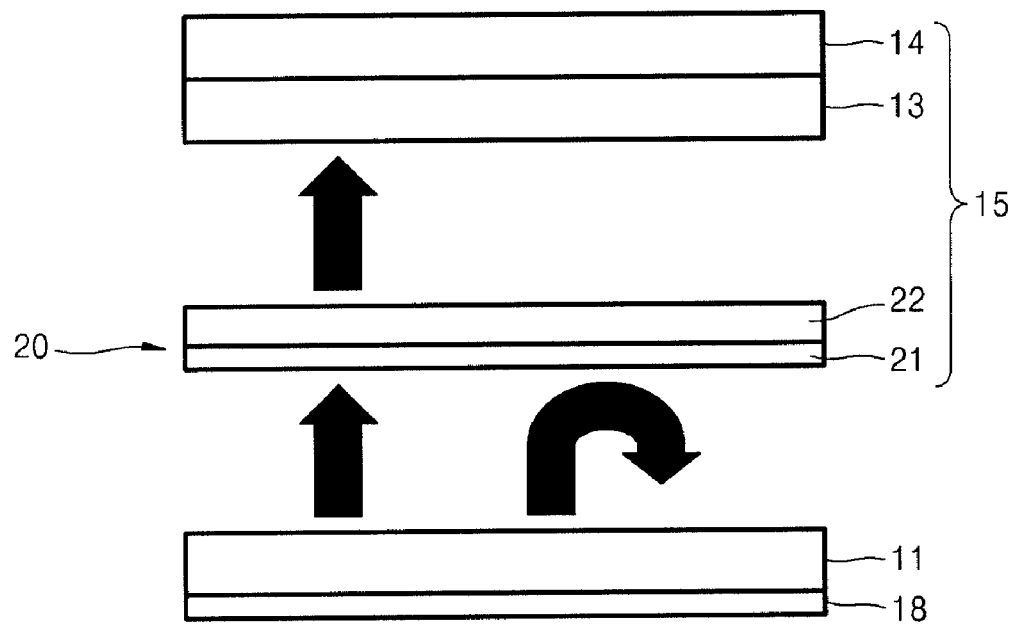
FIG. 22 is a cross-sectional view of a LCD apparatus using the active reflective polarizer according to the present invention.

Accordingly, the active reflective polarizer 20 according to the present invention can be used in various ways for display devices such as liquid crystal displays (LCDs). For example, FIG. 22 shows a cross-sectional view of an LCD apparatus employing the active reflective polarizer 20 according to the present invention. Referring to FIG. 22, the LCD apparatus includes a liquid crystal panel 15 and a backlight unit 11 facing a rear surface of the liquid crystal panel 15 and emitting light to the liquid crystal panel 15. The liquid crystal panel 15 includes a liquid crystal layer 13, a front polarizer 14 and the active reflective polarizer 20 as a rear polarizer. In such a configuration, the active reflective polarizer 20 in an on state transmits only half of the light emitted from the backlight unit 11 to the liquid crystal layer 13 and reflects the remaining half. The reflected light is reflected again on a reflecting plate 18 disposed under the backlight unit 11 to the active reflective polarizer 20. The backlight unit 11 typically includes a diffusion sheet (not shown), by which the reflected light is uniformly polarized. Accordingly, most of the light emitted from the backlight unit 11 can be used.

Although FIG. 22 shows that the active reflective polarizer 20 is used as the rear polarizer of the liquid crystal panel 15, the liquid crystal panel 15 may have a conventional absorptive polarizer as the rear polarizer and the active reflective polarizer 20 may be disposed between the liquid crystal panel 15 and the backlight unit 11. Further, the active reflective polarizer 20 according to the present invention may be attached to a light exit surface of the backlight unit 11 as a part of the backlight unit 11.

In case where the active reflective polarizer 20 is used in the display devices or the backlight unit, magnetic moments in the magnetic material layer 22 may have ferromagnetic origin. The magnetic moments having ferromagnetic origin hardly return to randomly oriented state, but remain in the aligned orientation even when external magnetic field is turned off. Accordingly, once the magnetic moments having ferromagnetic origin in the magnetic material layer 22 are aligned in a predetermined direction by applying current to the active reflective polarizer 20 when turning on the display device, it is not necessary to continue applying current to the active reflective polarizer 20.

Further, the active reflective polarizer 20 according to the present invention can be also used as other optical devices such as an optical shutter. For the case where magnetic moments in the magnetic material layer 22 is that of paramagnetic, superparamagnetic, or diamagnetic origin, the optical shutter can be allowed to transmit one polarization and reflect another by aligning these magnetic moments via externally applied magnetic field. By eliminating the externally applied magnetic field, the optical shutter can be allowed to reflect both polarizations of light. Therefore, the optical shutter according to the present invention can be controlled to transmit or block light.

For the case where magnetic moments in the magnetic material layer 22 is that of ferromagnetic origin, the optical shutter can be allowed to transmit one polarization and reflect another by aligning these magnetic moments via externally applied magnetic field. However, this time, elimination of externally applied magnetic field does not bring magnetic moments to randomly oriented state and magnetic moments remain aligned.

Throughout the present invention, the terms, □ Single domain □ magnetic particles or materials, have been used extensively in explaining the working principles of the present invention. A magnetic domain, by definition, is a region in which all of magnetic moments are parallel to each other. A particle or material is said to be of single domain if its volume (size) is just enough to hold only one magnetic domain. On the contrary, if a particle or material is large enough to hold more than one magnetic domain, it is said to be of multi-domain magnetic particle or material.

Although magnetic moments belonging to the same domain are parallel to each other, magnetic moments of different magnetic domains are not necessarily parallel to each other. In fact, magnetic moments of different magnetic domains are randomly oriented with respect to one another.

Multi-domain magnetic particle or material can be brought to a single domain via application of external magnetic field. When what was initially magnetically multi-domain particle (or material) turns into a single domain counterpart via application of external magnetic field, the material is said to be saturated.

Bulk magnetic material contains enormous amount of magnetic domains and it requires external magnetic field of strength in the range of several orders of Teslas to reach the saturation point, i.e., the single domain state. On the other hand, although it depends on material types, thin layer of magnetic material (thin magnetic film) or magnetic particles that are large enough to contain several magnetic domains may be brought to a saturation point with relatively weak external magnetic field, say, thousandth of a Tesla.

Although the terminology 58 single domain particle□ has been used throughout this invention, it is the single domain condition, not the actual size of particle, which is important. Provided sufficiently strong external magnetic field, magnetic material of any size, containing multiple number of magnetic domains, can be sufficiently saturated to a point where it can be approximately considered to be magnetically single domained. In summary, we emphasize that the physical size of magnetic particle is not limited to that of single domain size, but can be large enough to contain multiple magnetic domains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An optical device comprising:
   a magnetic material layer magnetized in a first direction, the magnetic material layer reflecting electromagnetic radiation having a magnetic field component parallel to the first direction and transmitting electromagnetic radiation having a magnetic field component perpendicular to the first direction.

2. The optical device of claim 1, wherein the magnetic material layer is formed of a plurality of magnetic particles and a transparent insulating medium in which the plurality of magnetic particles are embedded without agglomeration between the plurality of magnetic particles.

3. The optical device of claim 2, wherein each of the plurality of magnetic particles is surrounded by a transparent insulating shell or a transparent polymer-type insulating surfactant.

4. The optical device of claim 2, wherein the plurality of magnetic particles have a sphere, oval, square, rectangle, cylinder, elliptical or arbitrary shape.

5. The optical device of claim 2, wherein the plurality of magnetic particles comprise one or more of a ferromagnetic material, a superparamagnetic material, a paramagnetic material, a diamagnetic material, and a ferrimagnetic material.

6. The optical device of claim 2, wherein the plurality of magnetic particles are selected from the group consisting of titanium, cobalt, iron, nickel, aluminum, barium, platinum, sodium, strontium, magnesium, dysprosium, manganese, gadolinium, sliver, copper, chromium, cobalt-platinum ($Co_xPt_y$), iron-platinum ($Fe_xPt_z$), $MnZn(Fe_2O_4)_2$, $Mn\,Fe_2O_4$, $Fe_3O_4$, $Fe_2O_3$ and $Sr_8CaRe_3Cu_4O_{24}$, $Co_xZr_yNb_z$, $Ni_xFe_yNb_z$, $Co_xZr_yNb_zFe_v$, wherein x, y, z and v present a composition rate.

7. The optical device of claim 2, wherein the plurality of magnetic particles have a diameter within a range of 1 to 1000 nm.

8. The optical device of claim 1, wherein the magnetic material layer is magnetized in the first direction when a magnetic field is applied thereto and continues to be magnetized in the first direction after the magnetic field is removed therefrom.

9. The optical device of claim 1, wherein the magnetic material layer is first magnetized in the direction only while a magnetic field is applied thereto.

10. The optical device of claim 1, wherein the magnetic material layer has a thickness greater than a magnetic decay length of the magnetic material layer.

11. The optical device of claim 1, further comprising insulating layers on opposite surfaces of the magnetic material layer.

12. The optical device of claim 1, further comprising a transparent substrate above which the magnetic material layer is provided.

13. The optical device of claim 1, wherein the magnetic material layer is formed of a magnetic thin film having a thickness less than a micrometer.

14. The optical device of claim 1, wherein the magnetic material layer comprises magnetic polymers.

15. The optical device of claim 1, wherein the magnetic material layer is formed of a mixture of different particles of magnetic and transparent insulating materials.

16. The optical device of claim 1 further comprising a transparent protective film coated on a surface of the magnetic material layer.

17. The optical device of claim 1 further comprising an electrically conductive element disposed to at least one side of the magnetic material layer to apply a magnetic field to the magnetic material layer.

18. The optical device of claim 17 further comprising a power supply connected to the electrically conductive element.

19. The optical device of claim 17, wherein the electrically conductive element has a plurality of wires arranged on the magnetic material layer.

20. The optical device of claim 19, wherein spaces between adjacent wires of the plurality of wires are filled with transparent insulating material.

21. The optical device of claim 17, wherein the electrically conductive element is a transparent plate electrode.

22. A method of producing polarized electromagnetic radiation, comprising:
   magnetizing a magnetic material layer in a first direction;
   receiving electromagnetic radiation at the magnetic material layer;
   reflecting a first component of the electromagnetic radiation having a magnetic field component parallel to the first direction; and
   transmitting a second component of the electromagnetic radiation having a magnetic field component perpendicular to the first direction.

23. A method of producing polarized electromagnetic radiation, comprising:
   receiving electromagnetic radiation at a magnetic material layer magnetized in a first direction;
   reflecting a first component of the electromagnetic radiation having a magnetic field component parallel to the first direction; and
   transmitting a second component of the electromagnetic radiation having a magnetic field component perpendicular to the first direction.

24. A liquid crystal panel comprising:
   a liquid crystal layer; and
   a polarizer comprising a magnetic material layer magnetized in a first direction, the magnetic material layer reflecting light having a magnetic field component parallel to the first direction and transmitting light having a magnetic field component perpendicular to the first direction toward the liquid crystal layer.

25. A liquid crystal display comprising:
   a liquid crystal layer;
   a backlight unit which provides light;
   a polarizer disposed between the backlight unit and the liquid crystal layer, the polarizer comprising a magnetic material layer magnetized in a first direction, the magnetic material layer reflecting a first component of the light having a magnetic field component parallel to the first direction and transmitting a second component of the light having a magnetic field component perpendicular to the first direction.

* * * * *